United States Patent [19]
Sakiyama et al.

[11] Patent Number: 5,659,764
[45] Date of Patent: Aug. 19, 1997

[54] SIGN LANGUAGE GENERATION APPARATUS AND SIGN LANGUAGE TRANSLATION APPARATUS

[75] Inventors: Tomoko Sakiyama, Kokubunji; Eiji Oohira, Hamura; Hirohiko Sagawa, Kokubunji; Masaru Ohki, Tokorozawa; Kazuhiko Sagara, Hachioji; Kiyoshi Inoue, Tokyo; Yasunari Obuchi, Kokubunji; Yuji Toda, Hachioji, all of Japan; Masahiro Abe, Dublin, Ireland

[73] Assignee: Hitachi, Ltd., Tokyo, Japan

[21] Appl. No.: 200,702

[22] Filed: Feb. 23, 1994

[30] Foreign Application Priority Data

Feb. 25, 1993 [JP] Japan .................. 5-036346
May 31, 1993 [JP] Japan .................. 5-128702
May 27, 1993 [JP] Japan .................. 5-125705

[51] Int. Cl.$^6$ .................................. G06F 17/28
[52] U.S. Cl. .............. 395/753; 395/752; 395/173; 395/28; 340/825.19
[58] Field of Search .................. 364/419.01, 419.03, 364/513.5; 340/365, 709, 706, 825.19; 341/20; 434/229, 185, 169, 112; 395/752, 753, 757, 760, 173, 174, 175, 2.8

[56] References Cited

U.S. PATENT DOCUMENTS

| | | | |
|---|---|---|---|
| 4,307,266 | 12/1981 | Messina | 379/88 |
| 4,368,459 | 1/1983 | Sapora | 433/112 |
| 4,414,537 | 11/1983 | Grimes | 341/20 |
| 4,546,383 | 10/1985 | Abramatic et al. | 348/19 |
| 4,600,919 | 7/1986 | Stern | 345/122 |
| 4,601,054 | 7/1986 | Watari et al. | 395/2.47 |
| 4,878,843 | 11/1989 | Kuch | 434/112 |
| 4,975,961 | 12/1990 | Sakoe | 395/2.41 |
| 5,047,952 | 9/1991 | Kramer et al. | 395/2.8 |

FOREIGN PATENT DOCUMENTS

| | | | |
|---|---|---|---|
| 586259 | 3/1994 | European Pat. Off. | G09B 21/00 |
| 5-10704 | 10/1986 | Japan | G06F 15/38 |
| 2-14000 | 1/1990 | Japan | G10L 3/00 |
| 2-144675 | 6/1990 | Japan | G06F 15/62 |
| 2183371 | 7/1990 | Japan | G06F 15/38 |
| 3-186979 | 8/1991 | Japan | G06F 15/70 |
| 4-51372 | 2/1992 | Japan | G06F 15/62 |
| 4-134515 | 5/1992 | Japan . | |
| 4-156610 | 5/1992 | Japan | G06F 3/02 |
| 4-222014 | 8/1992 | Japan | G06F 3/02 |
| 4-363755 | 12/1992 | Japan | G06F 15/20 |
| 89/12290 | 12/1989 | WIPO | G09B 21/00 |

OTHER PUBLICATIONS

The Journal of The Institute of Television Engineers of Japan, vol. 44, No. 3, pp. 305–311 (1990).

The Journal of Information Processing Society of Japan, Human Interface 41-7 (Mar–2–1992), pp. 49–54.

(List continued on next page.)

*Primary Examiner*—Gail O. Hayes
*Assistant Examiner*—Stephen R. Tkacs
*Attorney, Agent, or Firm*—Fay, Sharpe, Beall, Fagan, Minnich & McKee

[57] ABSTRACT

A sign language interpretation apparatus for performing sign language recognition and sign language generation generates easily read sign language computer graphics (CG) animation by preparing sign language word CG patterns on the basis of actual motion of the hand through the use of a glove type sensor to generate natural sign language CG animation, and by applying correction to the sign language word CG patterns. Further, in the sign language interpretation apparatus, results of translation of inputted sign language or voice language are confirmed and modified easily by the individual input persons, whereby results of translation of the inputted sign language or voice language are displayed in a combined form desired by the user to realize smooth communication. Also, candidates obtained as a result of translation are all displayed and can be selected easily by the input person with a device such as a mouse. Further, when a polysemous word is available, the word is displayed while being changed in its display form, and other expressions are confirmed and modified with the mouse.

13 Claims, 43 Drawing Sheets

| display setting | | end |
|---|---|---|
| first candidate display | | another candidate display |
| sign language CG display | | sign language CG display |
| sign language illustration display | | sign language illustration display |
| sign language image display | | sign language word name display |
| sign language word name display | | text display |
| text display | | |

OTHER PUBLICATIONS

"Japanese Language Information Processing", The Institute of Electronics, Information and Communication Engineers of Japan, pp. i–vii.

The Journal of Information Processing Society of Japan, Graphics and CAD 57–3 (Jul–24–1992), pp. 17–24.

Badler et al.; "Digital Representation of Human Movement", *Computing Surveys;* v11 n1; Mar. 1979.

Badler et al.; "Special Problems in Human Movement Simulation", *ACM;* copyright 1980.

Kurokawa; "Gesture Coding and a Gesture Dictionary for a Nonverbal Interface", *IEICE Trans. Fundamentals;* vol. E75–A, No. 2; Feb. 1992.

Holden et al.; "The Graphical Translation of English Text into Signed English in the Hand Sign Translator System"; *Eruographics;* V11 N3; 1992.

Xu; "A Method for Synthesizing Animation to Transmit Sign Language by Intelligent Communication"; *Electronics and Communications in Japan Part 3;* v76 n2; 1993.

H. Kobayashi, et al, "The Recognition of Basic Facial Expressions by Neural Networks", 1991 IEEE International Joint Conference on Neural Networks, vol. 1 of 3, Nov. 18–21, 1991, pp. 460–466.

K. Wong et al, "Dynamic Programming in the Recognition of Connected Handwritten Script", IEEE Proceedings of the Second Conference on Artificial Intelligence Applications, The Engineering of Knowledge–Based Systems, Dec. 11–13, 1985, pp. 666–670.

H. Kawai et al, "Deaf–and–Mute Sign Language Generation System", Pattern Recognition, vol. 18, No. 3/4, 1985, pp. 199–205.

Technical Report of IPSJ, Information Processing Society of Japan, vol. 90, No. 66, 90–CG–46, 46–6, Aug. 1990, pp. 37–42.

Technical Report of IPSJ, Information Processing Society of Japan, vol. 90, No. 65, 90–CG–45, 45–5, Jul. 1990, pp. 1–8.

T. Miyajima et al, "Facial Expression Recognition Using Neural Network", IEICE (The Institute of Electronics, Information and Communication Engineerings), Fall Conference, D–408, 1990, pp. 6–410.

K. Wilt et al, "Computer–Aided Cued Speech Training/Translation", Proceedings of the Johns Hopkins National Search for Computing Applications to Assist Persons with Disabilities, FEb. 1–5, 1992, pp. 29–30.

T. Takahashi et al, "A Hand Gesture Recognition Method and Its Application", Systems and Computers in Japan, vol. 23, No. 3, 1992, pp. 38–48.

J. Xu et al, "Gesture Description and Structure of a Dictionary for Intelligent Communications of Sign Language Images", Transactions of the Institute of Electronics, Information and Communication Engineers, vol. J76–A, No. 9, Sep. 1993.

K. Murakami et al, "Gesture Recognition Using Recurrent Neural Network", Human Factors in Computing Systems, Reaching Through Technology, Chi '91, Conference Proceedings, New Orleans, LA, Apr. 27–May 2, 1991, pp. 237–242.

"Workplace Concept in Sign and Text. A Computerized Sign Language Dictionary", Western Pennsylvania School for the Deaf, Pittsburgh, 1991.

Oka, "Continuous Word Recognition Using Continuous DP", The Speech Study Group of Accoustical Society of Japan, S78–20, 1978, pp. 145–152.

Miura, "Auditory Sense and Voices", Institute of Electronics and Communication Engineers, 1980, pp. 522–543.

Kamisaka et al, "Pattern Recognition and Learning Algorithms", Bunichi Sogo Shppan, p. 91.

Hitachi news release of Aug. 31, 1992, pp. 1–3.

Article in the Yomiuri newspaper of Sept. 1, 1992.

Article in the Nikkei newspaper of Sep. 1, 1992.

F. Nouboud et al, "Authéntification de Signatures Manuscrites par Programmation Dynamique", Proceedings of the 1st International Conference, PIXIM 88, Computer Graphics In Paris, Oct. 28, 1988, Paris, France, pp. 345–360.

"Let Your Fingers Do the Talking", New Technology for New Vistas, pp. 16–17.

"Dataglove Model 2 Operation Manual", VPL Research Inc., Aug. 25, 1989.

H. Bornstein et al, "Signed English: A Basic Guide", Signing, copyright 1984.

"At Siggraph '89", VPL Research, Inc., copyright 1989.

"Body Electric", VPL Research, Inc.

Fig. 7

| upper |
|---|
| x, y, z |
| intermediate (vertically) |
| x, y, z |
| lower |
| x, y, z |
| right |
| x, y, z |
| intermediate(left / right) |
| x, y, z |
| left |
| x, y, z |
| ... |
| head |
| x, y, z |
| nx, ny, nz |
| ... |

- head — conceptual position 6420
- x, y, z — coordinates 6421
- nx, ny, nz — normal 6422

Fig. 10

| title | head | — 1001 |
|---|---|---|
| a part of speech | noun | — 1002 |
| center | x, y, z | — 1003 |
| directional axis | nx, ny, nz | — 1004 |
| moved hand | right | — 1005 |

1010 right hand 1012 data

α=0

1022  1023 data[0][1][0]  ⎫
data[0][1][1]  ⎬ ~1006
...            ⎭ data[α][t][0]  ⎫
data[α][t][1]  ⎬ ~1007
data[α][t][2]  ⎭ data[α][t][3]  ⎫
data[α][t][4]  ⎬ ~1008
data[α][t][5]  ⎭ data[α][t][6]   ⎫
data[α][t][7]   ⎪
data[α][t][8]   ⎪
data[α][t][9]   ⎪
data[α][t][10]  ⎬ ~1009
data[α][t][11]  ⎪
data[α][t][12]  ⎪
data[α][t][13]  ⎪
data[α][t][14]  ⎪
data[α][t][15]  ⎭
...

1011 left hand

α=1 data[1][1][0]
data[1][1][1]
data[1][1][2]
data[1][1][3]
...

case5

Fig. 25

| the number of candidates | n | | 241 |
|---|---|---|---|
| sentence candidates | candidate number | candidate | |
| | 1 | Don na guai desu ka? | 242 |
| | 2 | Atama wa do desuka? | |
| | ⋮ | ⋮ | |
| | n | Kuchi wa do desu ka? | |

| the number of candidates | n | | | | |
|---|---|---|---|---|---|
| word series candidate | candidate number | word number | word series | | |
| | | | expression number | word name | |
| | 1 | 3 | 1 | Byoki | |
| | | | 1 | nani | |
| | | | 2 | desu ka | kudasai |
| | ⋮ | ⋮ | ⋮ | ⋮ | |
| | n | | | | |

251, 252, 253, 254, 255, 256, 257

| the number of candidates | n | | | | |
|---|---|---|---|---|---|
| CGcandidate | candidate number | CG data | | | |
| | 1 | word number | m | | ~261 |
| | | word1 | expression number | o | ~264 |
| | | | | | ~265 |
| | | | expression 1 | data number | p | ~266 |
| | | | | data |  | ~267 |
| | | | | illustration | 2 | ~268 |
| | | | | additional image | ↔ ~269 | ~262 |
| | | | ⋮ | ⋮ | |
| | | | expression o | | |
| | | ⋮ | | | |
| | | wordm | | | |
| | ⋮ | ⋮ | | | |
| | n | | | | |

263

| data number | n |
|---|---|
| data 1 |  |
| data 2 |  |
| ⋮ | ⋮ |
| data n |  |

271 (header row), 272 (data rows)

Fig. 29

| display setting | | | end |
|---|---|---|---|
| first candidate display | | another candidate display | |
| sign language CG display | | sign language CG display | |
| sign language illustration display | | sign language illustration display | |
| sign language image display | | sign language word name display | |
| sign language word name display | | text display | |
| text display | | | |

| display setting | | | end |
|---|---|---|---|
| first candidate display | | another candidate display | |
| ◯ sign language CG display | | sign language CGdisplay | |
| sign language illustration display | | sign language illustration display | |
| sign language image display | | sign language word name display | |
| sign language word name display | | text display | |
| text display | | | |

291 points to the ◯ indicator.

292, 293

| display setting | | end |
|---|---|---|
| first candidate display | | another candidate display |
| 2101 ○ sign language CG display | | sign language CG display |
| 2102 ○ sign language illustration display | | sign language illustration display |
| sign language image display | | sign language word name display |
| sign language word name display | | text display |
| text display | | |

| display setting | | end |
|---|---|---|
| first candidate display | another candidate display | |
| 2111 ○ sign language CG display | sign language CG display | |
| 2112 ○ sign language illustration display | sign language illustration display | |
| 2113 ○ sign language image display | sign language word name display | |
| sign language word name display | text display | |
| text display | | |

| display setting | | end |
|---|---|---|
| first candidate display | | another candidate display |
| 2121 ○ sign language CG display | | sign language CG display |
| 2122 ○ sign language illustration display | | sign language illustration display |
| 2123 ○ sign language image display | | sign language word name display |
| 2124 ○ sign language word name display | | text display |
| text display | | |

| display setting | | end |
|---|---|---|
| first candidate display | another candidate display | |
| 2131 ○ sign language CG display | sign language CG display | |
| 2132 ○ sign language illustration display | sign language illustration display | |
| 2133 ○ sign language image display | sign language word name display | |
| 2134 ○ sign language word name display | text display | |
| 2135 ○ text display | | |

| display setting | | end |
|---|---|---|
| first candidate display | 2161 another candidate display | |
| sign language CG display | ◯ sign language CG display | |
| sign language illustration display | ◯ sign language illustration display | |
| sign language image display 2162 | ◯ sign language word name display | |
| sign language word name display | ◯ text display | |
| text display 2163 | 2164 | |

Fig. 40

| display setting | | | end |
|---|---|---|---|
| first candidate display | | another candidate display | |
| | sign language CG display | | sign language illustration display |
| | sign language illustration display | | text display |
| | text display | | sign language word name display |
| | sign language word name display | | |

| | first candidate display | another candidate display |
|---|---|---|
| 2201 | sign language CG display | sign language illustration display |
| 2202 | sign language illustration display | text display |
| 2203 | text display | sign language word name display |
| 2204 | sign language word name display | | display setting — end

| display setting | | | end |
|---|---|---|---|
| first candidate display | | another candidate display | |
| sign language CG display 2221 | ○ | sign language illustration display | |
| sign language illustration display | ○ | text display | |
| text display 2222 | ○ | sign language word name display | |
| sign language word name display | | | |

2223

SIGN LANGUAGE GENERATION APPARATUS AND SIGN LANGUAGE TRANSLATION APPARATUS

CROSS-REFERENCE TO RELATED APPLICATIONS

The present invention is related to (1) U.S. patent application Ser. No. 08/029,046 entitled "Sign Language Translation System and Method" filed on May 9, 1993, (2) U.S. patent application Ser. No. 08/111,380 entitled "Sign Recognition Apparatus and Method and Sign Translation System Using Same" filed on Aug. 24, 1993 (claiming the Convention Priority based on Japanese patent application 04-235633 filed on Sep. 3, 1992 and Japanese patent application 04-51300 filed on May 10, 1992) which is a continuation-in-part application of (1), (3) U.S. patent application Ser. No. 08/114,083 entitled "Sign-Language Learning System and Method" filed on Aug. 31, 1993 and (4) U.S. patent application Ser. No. 08/144,438 entitled "Sign Language/Word Translation System" filed on Nov. 2, 1993 (claiming the Convention Priority based on Japanese patent application 04-291105 filed on Oct. 29, 1992). The disclosure of the above U.S. applications are herein incorporated by reference.

BACKGROUND OF THE INVENTION

The present invention relates to a system for performing interpretation between an aurally normal person and an aurally handicapped person. Particularly, the invention is concerned with a sign language generation apparatus for converting a composition inputted by the aurally normal person into a sign language and displaying it in the form of an animation of CG (computer graphics), and a sign language interpretation apparatus capable of performing display of results of bidirectional interpretation between the aurally normal person and aurally handicapped person and confirmation of the results.

The sign language is a language for aurally handicapped persons who communicate information to a partner by using such means as facial expressions and the position, direction, moving direction, and moving speed of the hand, and is a system different from that of a spoken language used by aurally normal persons which has been developed by voice taking a leading part in the spoken language. Accordingly, when the aurally handicapped person converses with the aurally normal person, a conversation carried out in sign language is easier and higher in communication speed than a discussion by means of writing or lipspeech carried out using a spoken language belonging to a system of voice language. Therefore a conversion system between spoken language and sign language, that is, an automatic sign language interpretation apparatus has been desired.

The sign language interpretation apparatus consists of a sign language recognition apparatus for recognizing a sign language inputted by the aurally handicapped person and converting it into a spoken languages and a sign language generation apparatus for converting a spoken language inputted by the aurally normal person into a sign language and generating it in the form of an image.

Conventional techniques concerning the sign language generation apparatus will first be described. As a method of generating a sign language, a method of linking together images photographed in units of word and displaying the linked images or a method using animation has hitherto been available. Enumerated as an example of the former is A Sign Language Generation System Based on Optical Disc by Kawai, Tamura and Okazaki, Television Magazine, 14 (1990) (Literature 1), and enumerated as an example of the latter is Basic Study on Japanese Sign Language Expression Based on Animation by Terauchi, Nagashima (Yu), Mihara, Nagashima (Hide) and Yamato, Information Processing Society of Japan, Human Interface, 41-7 (1992) (Literature 2). A sign language image generated in Literature 2 is a two-dimensional line drawing and animation is generated by selecting image patterns from a series of operations and registering them, and interpolating a space between the image patterns automatically. Also, the joint position is inputted every key frame from a keyboard while making reference to a sign language operation code.

In order for a conversation in sign language to be carried out smoothly, the display speed of animation is desired to be high to such an extent that the rhythm of the conversation is not destroyed. Also, in order for the shape of the hand to be recognized correctly, the image needs to be three-dimensional. Further, since the hand is complicated in structure and small in size and the meaning of a sign differs depending on an angle of the finger joint, recognition can be made more easily when the display of an angle of hand or finger is expressed somewhat exaggeratedly than when expressed practically.

In a synthesis method using images, as they are, obtained by photographing a practical sign language as in Literature 1, the image is three-dimensional but the amount of information is large. A sign language CG dictionary in which sign language words are registered must store 2000 or more sign language words of which one has about 60 color images; therefore, when the amount of information to be stored per one sign language word is large, a large memory capacity is needed. Also, preparation of an image of the same person under the same condition is difficult to achieve, imposing a significant problem on dictionary maintenance. Further, it is very difficult to perform natural interpolation for the elbow and arm between displayed word images.

On the other hand, in the conventional technique using CG of Literature 2, the CG is of a two-dimensional line drawing; therefore, the depth is not known and recognition of the detailed shape of the finger is difficult to achieve. Also, since the elbow position is inputted from the keyboard every key frame, the operation is sophisticated, imposing a problem as to which portion of a sign language word should be selected.

In addition, a conventional technique using a glove type sensor for recognition of sign languages has been proposed in, for example, a sign language translation apparatus of JP-A-4-134515 (Literature 3). But, it is difficult to use data, as it is, of the glove type sensor for the sake of registering sign language word patterns used to generate and display sign languages. This is because fingers of a human body model wearing the glove type sensor cannot be expanded or bent sufficiently and therefore some data processing is needed in order that the data from the glove type sensor as it is can be used for generation and display of sign languages. Conceivably, this is due to a habit of the person performing a sign language while wearing the glove type sensor or due to accuracy limitations of the glove type sensor. Also, naturalness of sign language animation will sometimes be impaired owing to a fine vibration (noise) contained in data of coordinate positions. Further, in the case where a set of standard glove type sensors is used, information about only a portion which is frontal of the wrist can be obtained and hence the elbow position and the joint angles at the shoulder and elbow must be determined through calculation.

Next, a conventional technique concerning the whole of a sign language interpretation apparatus will be described.

Available as conventional techniques concerning the sign language interpretation apparatus are a technique for performing translation of a sign language into a corresponding voice language and display thereof, and a technique for performing translation of a voice language into a sign language and display thereof. In the translation of sign language into voice language, sign language words contained in a sign language are recognized through pattern retrieval and a neural network, and corresponding word names in voice language are determined and displayed. Further, a technique is available in which a series of recognized words is shaped into the form of a sentence and delivered. Also, in the translation of voice language into sign language, as mentioned in the previous Literatures 1 and 2, an inputted sentence in voice language may be decomposed into a series of words and CG in sign language, or a video image in sign language corresponding to each word is displayed. (In the present specification, "voice language" is not used in the meaning of a language per se uttered in voice but is used in a wider meaning of so-called expressions used in spoken language. It may be inputted using a separate medium such as a keyboard. It may be considered to be substantially synonymous with "spoken language".)

On the other hand, in a voice recognition apparatus and a machine translation apparatus involved in techniques related to the sign language interpretation apparatus, there has been proposed a technique in which results of recognition and results of translation are displayed, and an input person performs confirmation and modification. In this technique, a method is principally adopted wherein a plurality of candidates are determined, and they are enumerated and displayed to the input person to permit the input person to select a correct candidate from them. In a method of displaying candidates, a word name or sentence corresponding to an inputted voice is displayed by, for example, voice recognition and a Japanese word or an English word or sentence corresponding to a Japanese sentence is displayed by Japanese-English translation.

The above conventional techniques concerning the sign language interpretation apparatus do not refer to methods for display, confirmation and modification of results of interpretation which are important to the sign language interpretation apparatus serving as a communication support.

In the case where methods for display, confirmation and modification used in the aforementioned voice recognition apparatus and machine translation apparatus are utilized, if for example a sign language is merely recognized and translated into a voice language and results of translation are simply displayed, then it is impossible for the input person to confirm whether an inputted sign language is communicated to a partner while being recognized correctly, or to make a correction in the event that the inputted sign language is erroneously communicated, because some aurally handicapped persons have difficulties in understanding voice language. Also, in the translation of voice language into sign language, the aurally normal person cannot confirm whether the translation is done to have a correct meaning if only a sign language standing for results of translation is presented.

SUMMARY OF THE INVENTION

A first object of the present invention is to permit, in the sign language generation apparatus, the generation of a natural sign language by preparing animation through the use of sign language word CG patterns picked up by a glove type sensor and promote visualization of display of a sign language by adding corrections to the sign language word CG patterns.

A second object of the present invention is to enable individual input persons to easily confirm results of translation of inputted sign language or voice language in the sign language interpretation apparatus (sign language recognition apparatus and sign language generation apparatus). Also, it is intended to permit rapid correction in the event of occurrence of an error in translation results for the sake of carrying out smooth communication.

In a first aspect of the present invention, with the aim of promoting visualization of display of a sign language, a human body model is generated in the form of three-dimensional color computer graphics, and sign language word CG data for moving this model is registered in a unit of sign language word. As the sign language word CG data, time series data of positions and directions of the hand and finger joint angles is fetched in a unit of sign language word by performing sign language every sign language word in advance while wearing the glove type sensor, and the time series data is stored in the form of sign language word CG patterns.

Since information obtained from the glove type sensor concerns a portion which is frontal of the wrist, the elbow position and joint angles of the shoulder and elbow are determined through calculation. Here, in order to determine the elbow position definitely and determine an elbow position which is not visually unnatural by using a small amount of calculation, the following two conditions are adopted including that (a) the elbow position lies on a plane containing a position of the hand and positions of the left and right shoulders of the human model and (b) the elbow position does not go toward the body beyond a line connecting a position at which the root of that elbow lies and a position of the hand. Further, (c) a condition that the length of arm is definite may be adopted.

Also, since in sign language different finger joint angles define different sign language words, the finger shape is classified into five fundamental patterns necessary to indicate differences in meaning. Then, when registering sign language word CG patterns, a portion at which the shape of finger is held is searched from data collected by using the glove type sensor, a held finger shape is compared with the fundamental patterns and data of the most analogous pattern is registered ultimately. At that time, noise contained in the data is eliminated.

Further, in order to effect natural movement of the human body model which performs sign languages, motion of the hand between sign language word CG patterns is linearly interpolated. Firstly, between a position of the hand of the human body model at the time that a word to be generated ends (here called a start point) and a position of the hand of the human body model at the time that a succeeding word starts (here called an end point), a locus along which the hand is to be moved is designated. When a coordinate point on the locus is given, an elbow position of the human body model and a joint angle of the elbow are determined automatically in accordance with a method of the present invention and therefore the hand of the human body model naturally moves on the designated locus, thus perfecting interpolation between the start point and the end point. Also, bending of the finger joint is displayed while adding a value, obtained by dividing a difference between a bending angle at the start point and a bending angle at the end point by the number of divisions of the locus, to the bending angle at the start point.

According to the first aspect of the present invention, the following first to sixth effects can be attained. In the first place, sign language patterns obtained by deforming an actual sign language at a constant ratio in terms of time and space can be registered by using the glove type sensor when registering sign language word CG patterns, and hence motion of the hand of the human body model is natural. Also, since motion of the hand per sign language word is sequentially registered, the problem as to which portion should be picked up as a registration image pattern can be solved.

Secondly, the elbow position is automatically calculated from the hand position and therefore even when the number of displays is increased, a sophisticated operation is not needed upon determination of the elbow position. Also, by conditioning the elbow position such that it is limited to a range which does not impair naturalness, the elbow position is determined definitely. Under this condition, the amount of calculation of the elbow position and the angle of of the elbow joint can be reduced, thus increasing the speed of display of the sign language CG.

Thirdly, since motion of the hand between sign language words undergoes the interpolation processing, a natural display of animation can be ensured.

Fourthly, by classifying data of the finger shape collected by using the glove type sensor into five fundamental finger shapes and correcting the data, the finger shape is rendered to be clear and sign languages can be recognized easily.

Fifthly, by removing noise from coordinates of hand position collected by using the glove type sensor, a fine vibration which is not exerted by ordinary men can be eliminated.

Sixthly, since sign language word CG patterns can be registered easily by inputting patterns word by word by means of the glove type sensor, sign language words to be registered can be increased easily and expressions of registered sign languages can be changed easily to meet a local dialect or expressions favorite with an individual.

According to a second aspect of the present invention, displays by a plurality of means such as a sentence in voice language, a word name in voice language, an illustration of a sign language word, sign language CG and an image of a sign language performed by an aurally handicapped person are displayed in combination through desired setting by the user, and in a display of sign language CG, illustrations of sign language words corresponding to a displayed sign language or word names in voice language are displayed while changing their display forms, whereby the user can easily confirm whether a sign language or a voice inputted by the user is translated correctly.

Also, by displaying all candidates obtained as a result of translation to permit the input person to easily select a candidate with means such as a mouse, and by displaying a polysemous word while changing its display form, when the word is selected, a candidate for another sign language word or word name is displayed so as to be selected easily by the input person with such means as the mouse, thus making it easy to correct an error in results of translations.

Further, by displaying results of old translation in the form of a history of conversation, a hearer can also be allowed to judge to some extent whether results of translation of a sign language or a voice language performed by a speaker are correct by utilizing the context.

According to the second aspect of the present invention, the following first to third effects can be attained. Firstly, since in the display of results of translation a display method can be selected which meets the desire of the user and displays of plural forms can be compared with each other and confirmed, acceptability and unacceptability of the translation results can be decided easily.

Secondly, confirmation and modification of a plurality of candidates and polysemous words in the respective candidates can be effected with simple means such as a mouse, and therefore errors can be corrected easily.

Thirdly, by displaying a history of conversation, the hearer can also be allowed to judge to some extent whether results of translation of a sign language or a voice language performed by the speaker are correct by utilizing the context, and hence the speaker can be freed from taking time for perfect correction of erroneously recognized results, thus ensuring smooth communication.

BRIEF DESCRIPTION OF THE DRAWINGS

FIG. 7 shows the structure of data indicative of the correspondent relation between the display conceptual position and real coordinates.

FIG. 10 shows the structure of data registered in a sign language word CG pattern.

FIG. 25 shows a format of sentence candidates.

FIG. 26 shows a data format of word series candidates.

FIG. 29 shows a display setting picture of an aurally normal person side display unit.

FIG. 40 shows a display setting picture in the aurally handicapped person side display unit.

DESCRIPTION OF THE PREFERRED EMBODIMENTS

Figure 1:
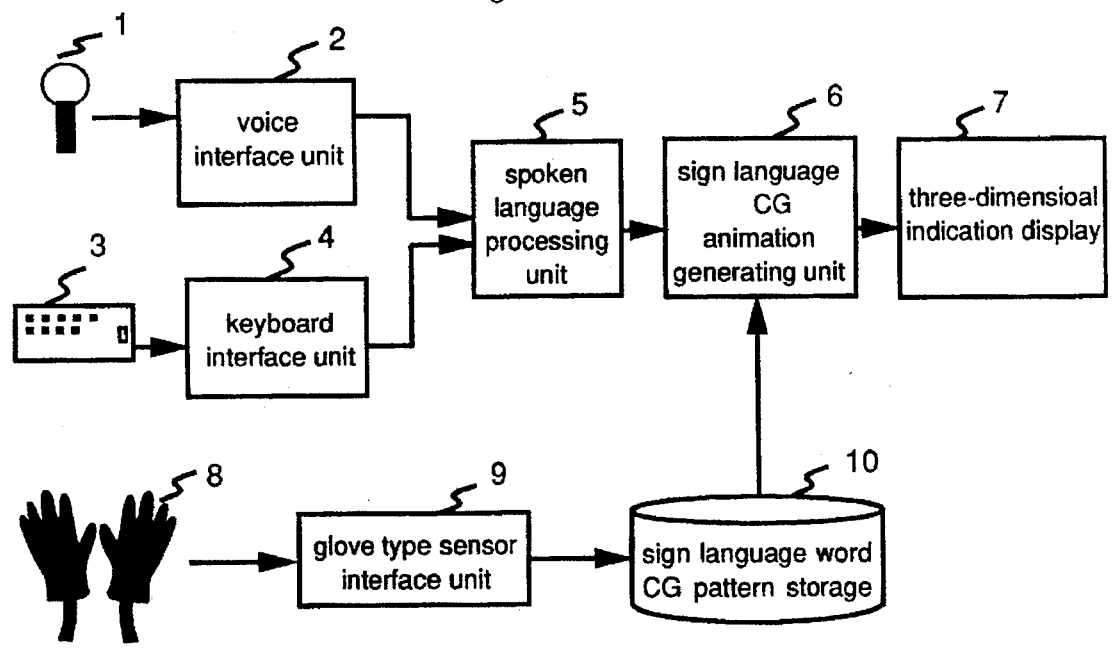
FIGS. 1A and 1B are block diagrams showing the construction of a sign language generation apparatus according to the present invention.
Figure 1:
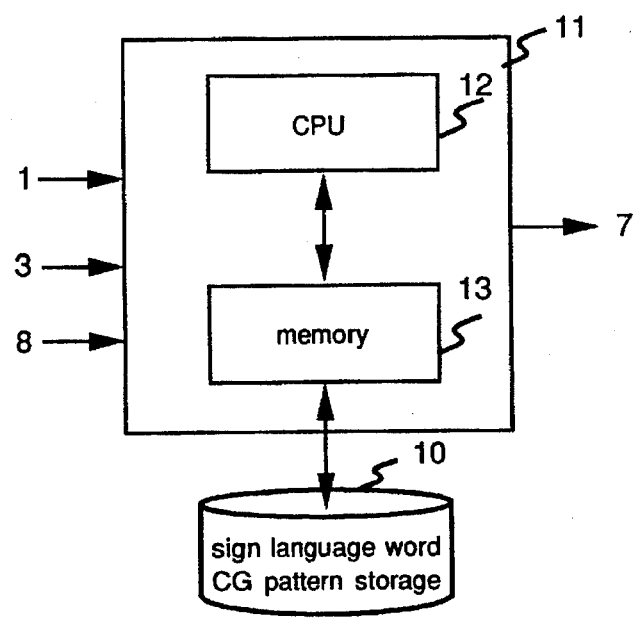

Embodiments of the present invention will be described hereunder by way of example of a sign language in Japanese, but the present invention can be applied to various types of sign languages used in other countries and areas including a sign language used in America (ASL).

A first embodiment of the present invention will be described with reference to FIG. 1A to FIG. 21.

FIG. 1A is a block diagram showing an embodiment of the present invention. Reference numeral 1 designates a microphone for inputting a composition invoice language and 2 a voice interface unit for converting a signal sent from the microphone 1 into a kana and kanji coexistent sentence recognizable by a computer, which unit can be realized with a conventional voice recognition apparatus (for example, see JP-A-2-14000). Reference numeral 3 designates a keyboard for inputting a composition in voice language and 4 a keyboard interface unit for converting an input 3 into a kana and kanji coexistent sentence. The technique as above can be realized with a kana and kanji conversion technique used in conventional word processors (for example, see JP-A-4-363755).

Denoted by 5 is a spoken language processing unit for performing a spoken language analysis of the inputted voice language composition, rearranging sign language words so that they may meet a sign language-like expression and determining a display position of a sign language. As the technique for the spoken language analysis, a conventional technique can be used (for example, see *Japanese Information Processing* by Makoto Nagao, edited by The Institute of Electronics and Communication Engineers of Japan).

In a succeeding sign language CG animation generating unit 6, corresponding sign language word CG patterns are retrieved from a sign language word CG pattern storage 10 in accordance with an arrangement of sign language words to build a human body model. Then, motion of the hand of the human body is interpolated between sign language word CG patterns. Finally, 7 designates a three-dimensional indication display which displays a sign language animation in the form of three-dimensional color CG on the display screen 7.

Reference numeral 8 designates a glove type sensor for registering sign language word CG data, and a person who wants to register sign language words wears the glove type sensor and performs a sign language word by word (that is, sign-language word by sign-language word). Denoted by 9 is a glove type sensor interface unit which adds titles to data sent from the glove type sensor and registers the data in the sign language word CG pattern storage 10. Portrait data for generation of fundamental looks such as "uresii" (happy), "kanashii" (sad) and "kutsuhda" (painful) is also prepared in advance and stored in the sign language word CG pattern storage 10 with titles.

FIG. 1B is a hardware structure diagram corresponding to FIG. 1A, showing that respective input units such as the microphone 1, keyboard 3 and glove type sensor 8, and output units standing for the sign language word CG pattern storage 10 and three-dimensional indication display 7, are connected to a computer 11. It is to be noted that the sign language word CG pattern storage 10 is constructed of a memory such as a magnetic disc unit or an optical disc unit. In the computer 11, programs corresponding to the voice interface unit 2, keyboard interface unit 4, spoken language processing unit 5, sign language animation generating unit 6 and glove type sensor interface unit 9, respectively, and data are stored on a memory 13, and various data processings can be carried out by suitably executing these programs.

The apparatus construction of FIGS. 1A and 1B is such that sign language word patterns picked up by using the glove type sensor are registered and, when an aurally normal person inputs a sentence (a word series) in voice language through, for example, the keyboard, an animation indicating a sign language in the form of a combination of the registered sign language word CG patterns is automatically generated in the form of three-dimensional CG.

The operation of the first embodiment of the present invention will be described in greater detail with reference to FIG. 1A to FIG. 21.

Firstly, in FIG. 1A, when a composition reading "Atama ga itai" (I have a headache) is inputted through the microphone 1 or the keyboard 3, the composition is converted by the voice interface unit 2 or the keyboard interface unit 4 into a kana and kanji coexistent sentence recognizable by the computer.

Figure 2:
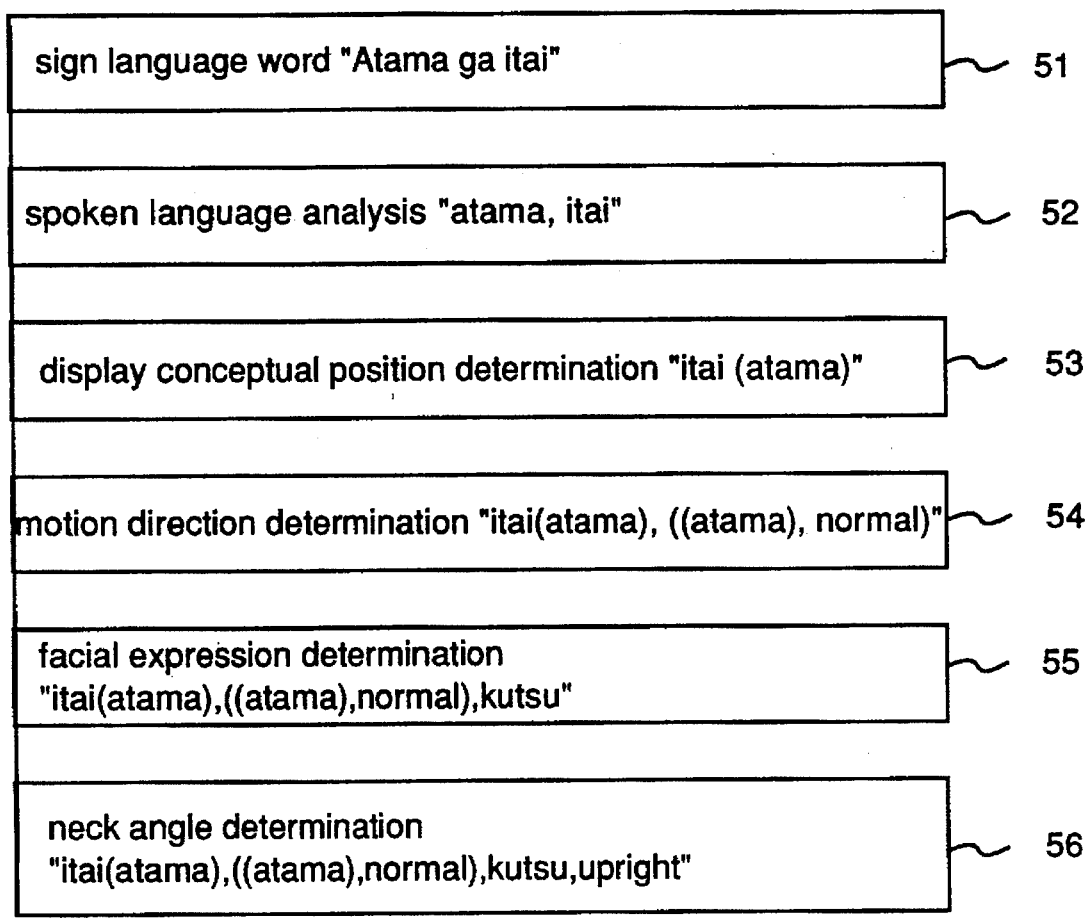
FIG. 2 is a PAD for conceptually determining display forms.

Next, a method of conceptually determining the display form in 5 of FIG. 1A will be described with reference to FIG. 2. When a sign language word "Atama ga itai" is inputted (51), a sentence structure/meaning analysis is carried out and any particles and auxiliary verbs are removed from the composition and "Atama ga itai" is decomposed into "atama" (head) and "itai" (ache) (52). It is then designated that a conceptual position of the hand when expressing "itai" is (atama) and the direction of motion is a normal direction vertical to the head and designated by 6409 in FIG. 6 (53). It is also designated in respective steps of motion direction determination (54), look determination (55) and neck angle determination (56) that the look is "kutsu" (pain) and the neck is "massugu" (upright). Here, (atama) is defined not to represent a term reading "atama" but to represent a position on the head, and an expression for the aforementioned indication designation is defined as containing "title (indication position), (a position where a vector indicative of a direction of motion exists), direction of vector, look and inclination of neck". Accordingly, "itai (atama), ((atama), normal), kutsu, massugu" stands herein. On the other hand, an indication position on "atama" is not designated because a registered sign language word CG pattern comes to a position on the head. In the phase of this time point, it is enrolled to indicate a sign language of "itai" at a part of (atama) but concrete coordinates on (atama) are not designated.

Figure 3:
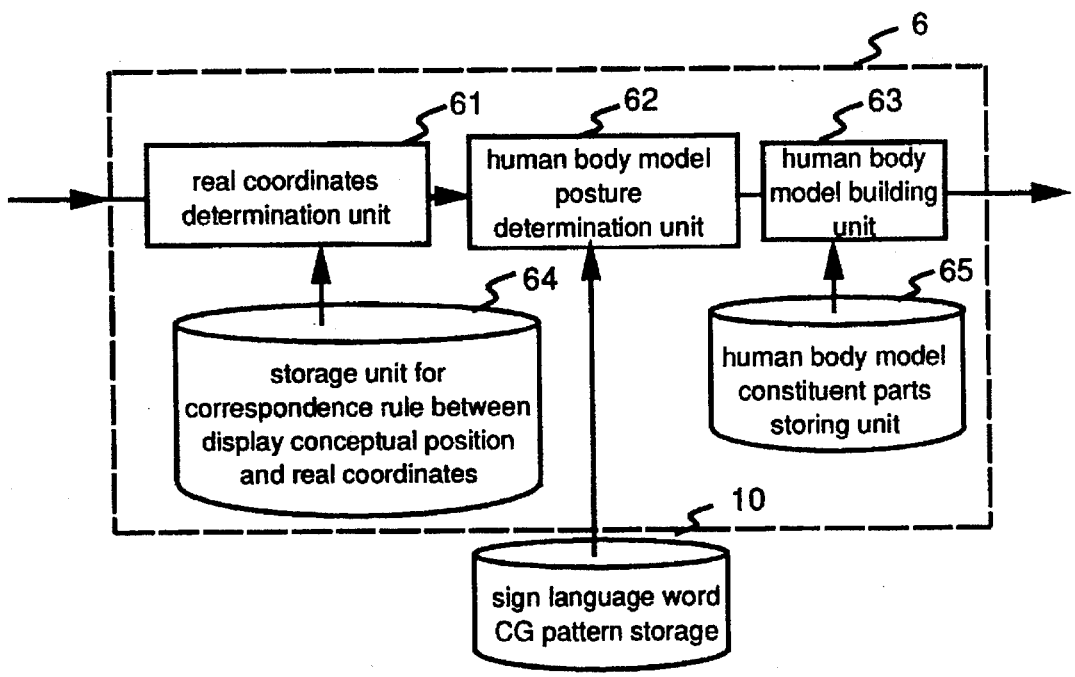
FIG. 3 is a block diagram of a sign language CG animation generating unit.

FIG. 3 is a block diagram of the sign language CG animation generating unit 6. A real coordinates determining unit 61 applies a concrete coordinate position to a display conceptual position (itai) in accordance with a display conceptual position real coordinates corresponding rule storing unit 64. In a human body model posture determining unit 62, data having a data structure as shown in FIG. 10 having titles "atama" and "itai" and a look CG of "kutsu" are retrieved from the sign language word CG pattern storage 10 and an elbow position is determined. A human body model constituent parts storing unit 65 stores information about the arrangement of polygons constituting a human body model and of polygons for display of the fundamental posture. In a human body model building unit 63, the polygons are moved in accordance with these information pieces and elbow and shoulder joint angles determined by the human body model posture determining unit 62 to build a human body model.

Figure 4:
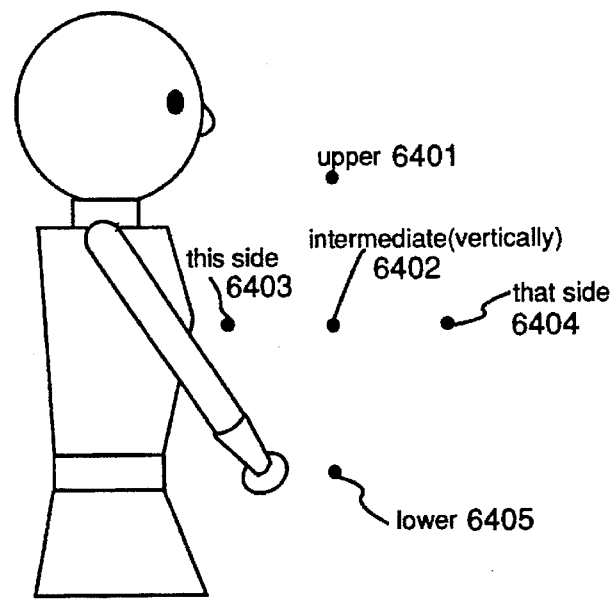
FIG. 4 shows the relation between the display conceptual position, indicative of the vertical relation and depth relation, and a human body model.
Figure 5:
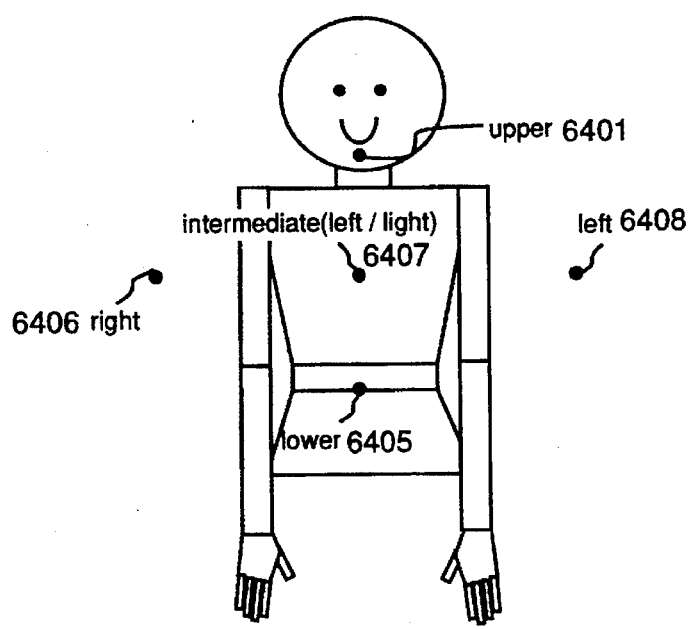
FIG. 5 shows the relation between the display conceptual position, indicative of the vertical relation and left-right relation, and the human body model.
Figure 6:
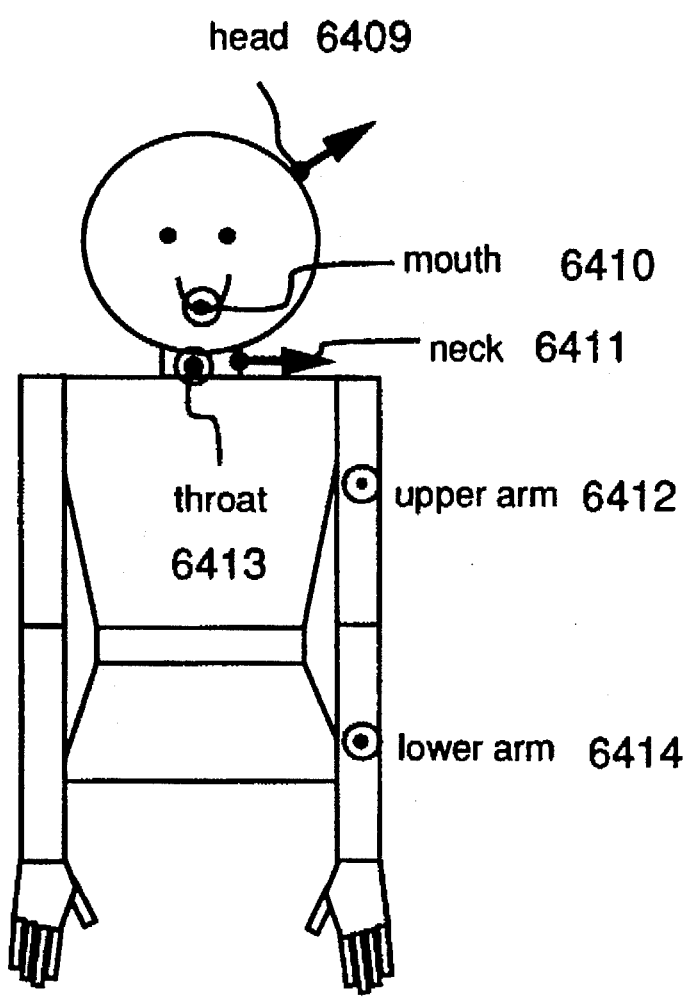
FIG. 6 shows the relation between the display conceptual position indicative of portions of body and the human body model.

FIGS. 4 and 5 show the relation between a human body model and spatial conceptual positions (upper 6401, intermediate (vertically) 6402, this side 6403, that side 6404, lower 6405, right 6406, intermediate (left/right) 6407 and left 6408). FIG. 6 shows the relation between the human body model and conceptual positions indicative of positions on a body (head 6409, mouth 6410, neck 6411, upper arm 6412, throat 6413 and lower arm 6414) and normal vectors corresponding to the respective conceptual positions. Here, a double circle represents a normal vector which is perpendicular to the sheet of drawing and directed to this side. FIG. 7 shows the structure of data representing the relation among conceptual positions, coordinates of the conceptual positions and normal vectors. In the block diagram of FIG. 3, the real coordinates determining unit 61 applies a concrete coordinate position at 6421 in FIG. 7 to the conceptual position of (atama) shown at 6409 in FIG. 6 and at 6420 in FIG. 7 in accordance with the display conceptual position real coordinates corresponding rule storing unit 64.

Figure 8:
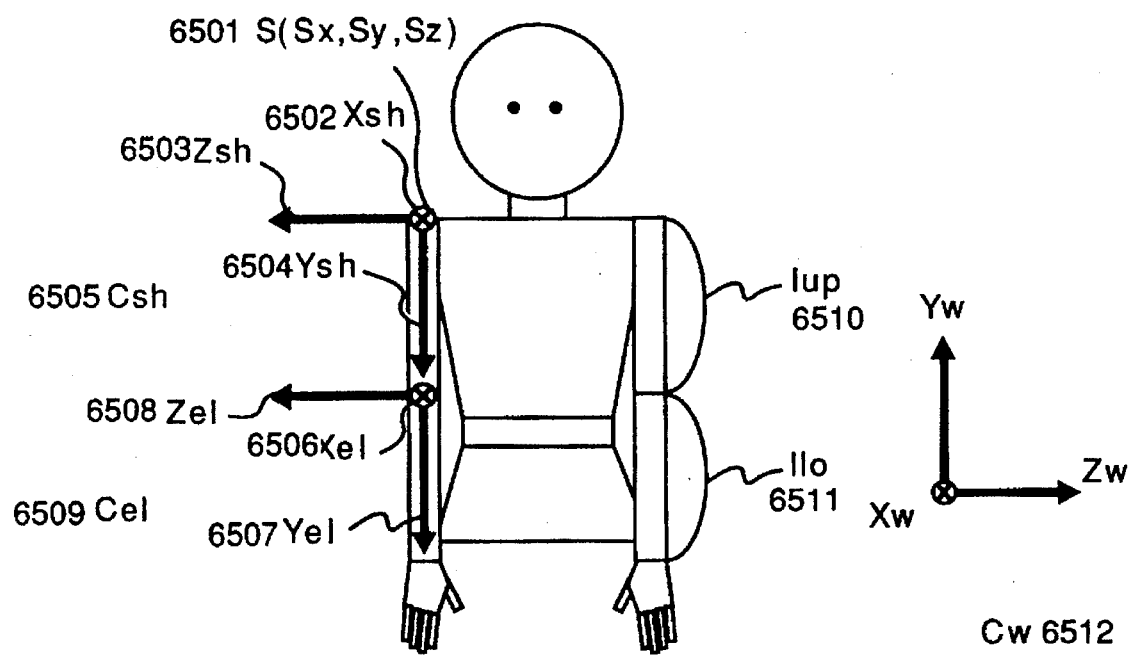
FIG. 8 shows the fundamental posture of human body model and coordinate systems.
Figure 11:
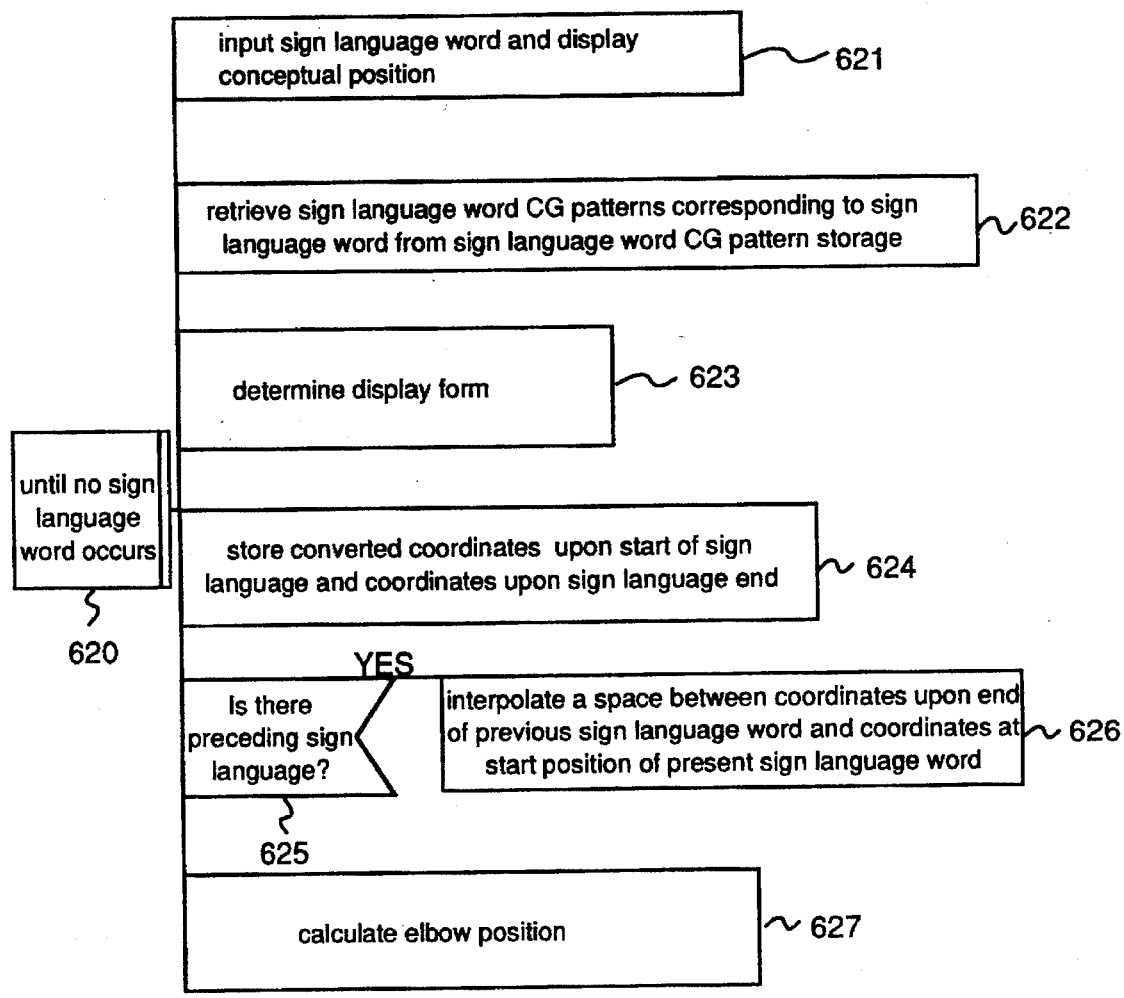
FIG. 11 shows a PAD of a human body model posture determining unit.
Figure 12:
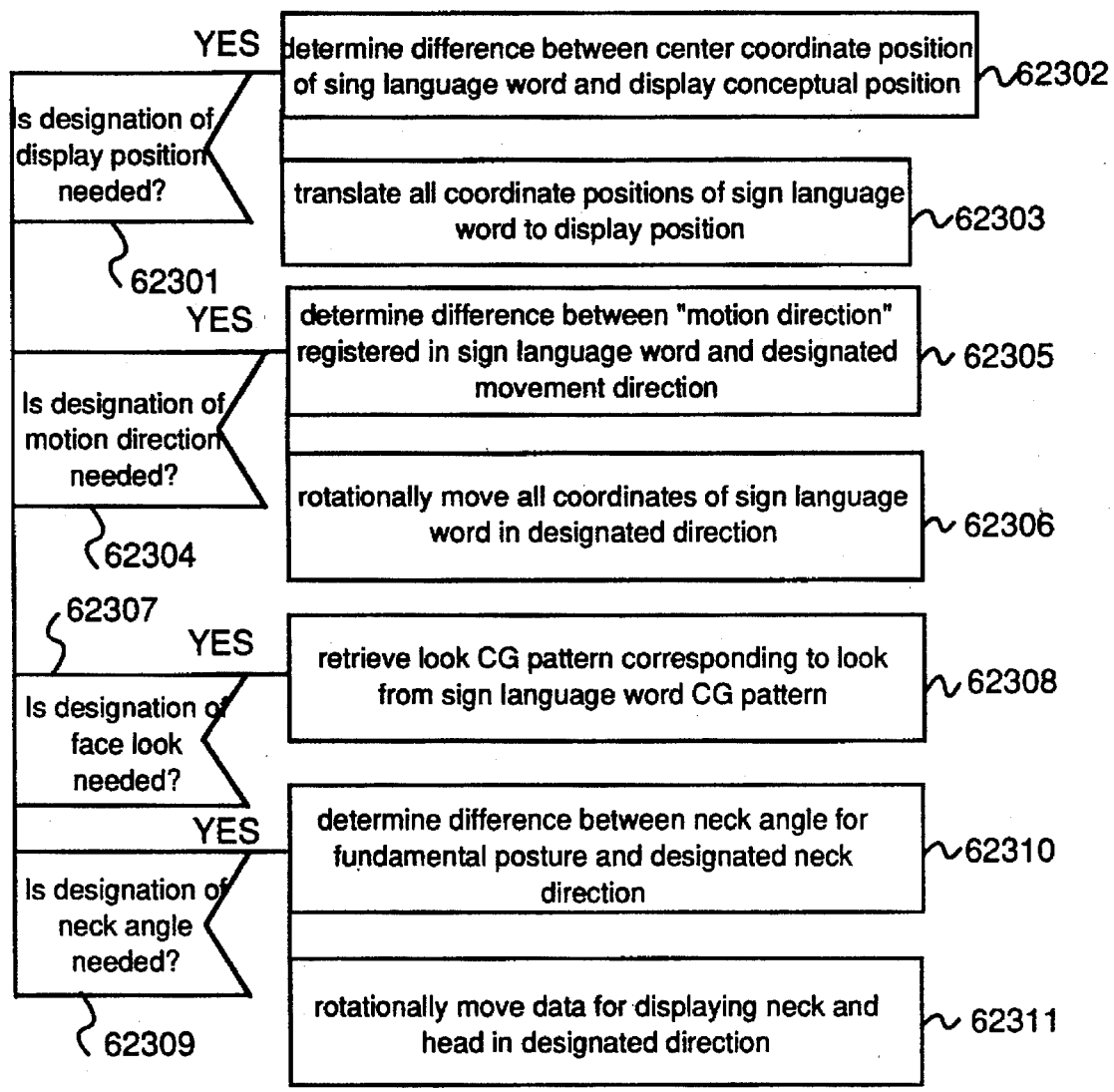
FIG. 12 shows a PAD of a display form determining unit.

In the succeeding human body model posture determining unit 62, a posture of the human body model is determined in accordance with PADs' shown in FIG. 11 and FIG. 12 by making reference to the sign language word CG patterns stored in the sign language word CG pattern storage 10. Firstly, the human body model will be described with reference to FIGS. 4, 5, 6, 8 and 9. Before a target point to which the hand is to be moved is given, the human body model takes the fundamental posture as shown in FIG. 8. Csh6505 is a local coordinate system (Xsh, Zsh, Ysh) having its origin at a shoulder position S6501 and represented by 6502 to 6504, Ce16509 is a local coordinate system having its origin at an elbow position, and Cw6512 is a world coordinate to which the whole of the human body model belongs. Denoted by 1up6510 is a length of an upper arm and by 11o6511 is a length of a forearm. Here, a denotation indicated by × described in a circle represents a vector which increases in a direction directed perpendicularly and backwardly of the sheet of drawing.

Figure 9:
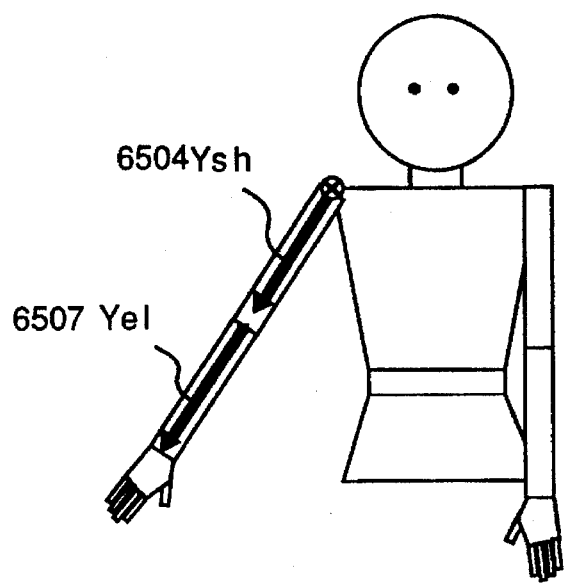
FIG. 9 shows the relation between an upper arm and a forearm.

In order to move an upper arm of the human body model, rotation angles about the axes Xsh6502, Ysh6504 and Zsh6503 in the Csh6505 are designated and a polygon representative of the upper arm is rotationally moved by given rotation angles. Similarly, in order to move the forearm, rotation angles about the axes Xe16506, Ye16507 and Ze16508 in the Ce16509 are designated and a polygon representing the forearm is rotationally moved. Also, the Ye16507 is moved concomitantly with the Ysh6504 as shown in FIG. 9.

Next, data of a sign language word CG dictionary registered in the sign language word CG pattern storage 10 will be described. The data structure is shown in FIG. 10. Denoted by X, y and Z are coordinates of a position of the hand, by nx, ny and nz is a direction of the hand, by t1 is an angle of the first joint of the thumb, by t2 is an angle of the second joint of the thumb, by i1 is an angle of the first joint of the index finger, by i2 is an angle of the second joint of the index finger, by m1 is an angle of the first joint of the middle finger, by m2 is an angle of the second joint of the middle finger, by r1 is an angle of the first joint of the ring finger, by r2 is an angle of the second joint of the ring finger, by p1 is an angle of the first joint of the little finger and by p2 is the second joint of the little finger.

Upon retrieval of sign language words, "title" 1001 and "a part of speech" 1002 are used and "center" 1003 represents the center of a range within which the hand moves when a sign language is performed, in terms of coordinates of the Cw6512. Since, in sign languages, a direction in which the hand is moved has a significant meaning, vectors being along the directions of motion of registered sign language patterns are registered in "directional axis" 1004. Positions of the hand and angles of the finger joints are registered in "data" 1012 one time after another. Here, in arranged data, a first column 1022 indicates to which of the right hand and the left hand the data belongs, wherein 0 represents the right hand and 1 represents the left hand. A second column 1023 indicates the time and a third column indicates the kind of data such as positions 1007 of the hand, directions 1008 of the hand and angles 1009 of the first joint of the thumb.

Based on the contents described as above, a method of determining a posture of the human body model will be described in accordance with flow charts shown in FIGS. 11 and 12. Here a sign language word reading "itai" (ache) is taken as an example. When the sign language "itai" and its display conceptual position "itai (atama), ((atama), normal), kutsu, massugu" are inputted (621), sign language word CG patterns corresponding to "atama" are searched from the sign language word CG pattern storage 10 (622). Subsequently, determination of display form is carried out (623). Since designation of a display position is needed (62301 in FIG. 12), concrete coordinates shown at 6421 in FIG. 7 are applied to the display position (atama) shown at 6409 in FIG. 6 in accordance with the display conceptual position real coordinates corresponding rule storing unit 64 of FIG. 3.

Next, a difference between the center coordinate position of the sign language word shown at 1003 in FIG. 10 and the display coordinate position shown at 6421 in FIG. 7 is determined (62302 in FIG. 12) and data (1012 in FIG. 10) of a hand position registered in data of the sign language word CG pattern is translated to a display position (atama) (62303 in FIG. 12). Since designation of "direction of motion" is also needed (62304 in FIG. 12), an angle between a vector of a directional axis shown at 1004 in FIG. 10 and registered in the sign language word CG pattern storage 10 of FIG. 3, and a normal vector (6422 in FIG. 7) on the head registered in the display conceptual position real coordinates corresponding rule storing unit 64 is calculated (62305 in FIG. 12), and data (1007 in FIG. 10) of the hand position is rotationally moved (62306 in FIG. 12). Further, since designation of a look is needed (62307 in FIG. 12), a look CG pattern "kutsu" is retrieved from the sign language word CG pattern storage 10 of FIG. 3 (62308 in FIG. 12). Finally, since designation of an angle of neck purports "massugu", the neck keeps the same posture as that in the fundamental posture of FIG. 8 (62309 in FIG. 12).

If designation of an angle of neck is required at 62309 in FIG. 12, then a difference between the angle of neck for the fundamental posture and a designated neck direction is determined (62310 in FIG. 12) and data for displaying the neck and the head is rotationally moved in a designated direction (62311 in FIG. 12).

For use in interpolation of data, coordinates upon sign language start, which have been moved to the display coordinate position shown at 6421 in FIG. 7, and coordinates upon sign language end are stored (624). Since a sign language word "atama" precedes the display of a sign language word "itai" (625), a space between coordinates of the hand of the human body model upon end of the sign language word "atama" and coordinates upon start of the sign language word "itai" is interpolated (626). When interpolating, a locus along which the hand is to be moved is drawn in a space between the position of the hand of the human body model indicating an end position of "atama" and the position of the hand of the human body model indicating a start point of "itai" and coordinates of positions obtained by dividing the locus by ten are inserted between the sign language word CG patterns "atama" and "itai", thus completing the interpolation. Also, a difference between a bending angle at the start point and a bending angle at the end point is divided by the number of divisions of the locus to obtain a value and the value is displayed while being added to the bending angle at the start point, thus completing interpolation of finger joint angles. Since positions of the hand of the human body model are all determined through the above, an elbow position is determined in accordance with a PAD shown in FIG. 13 (627). No sign language word follows "itai" (620) and therefore the program ends.

Figure 13:
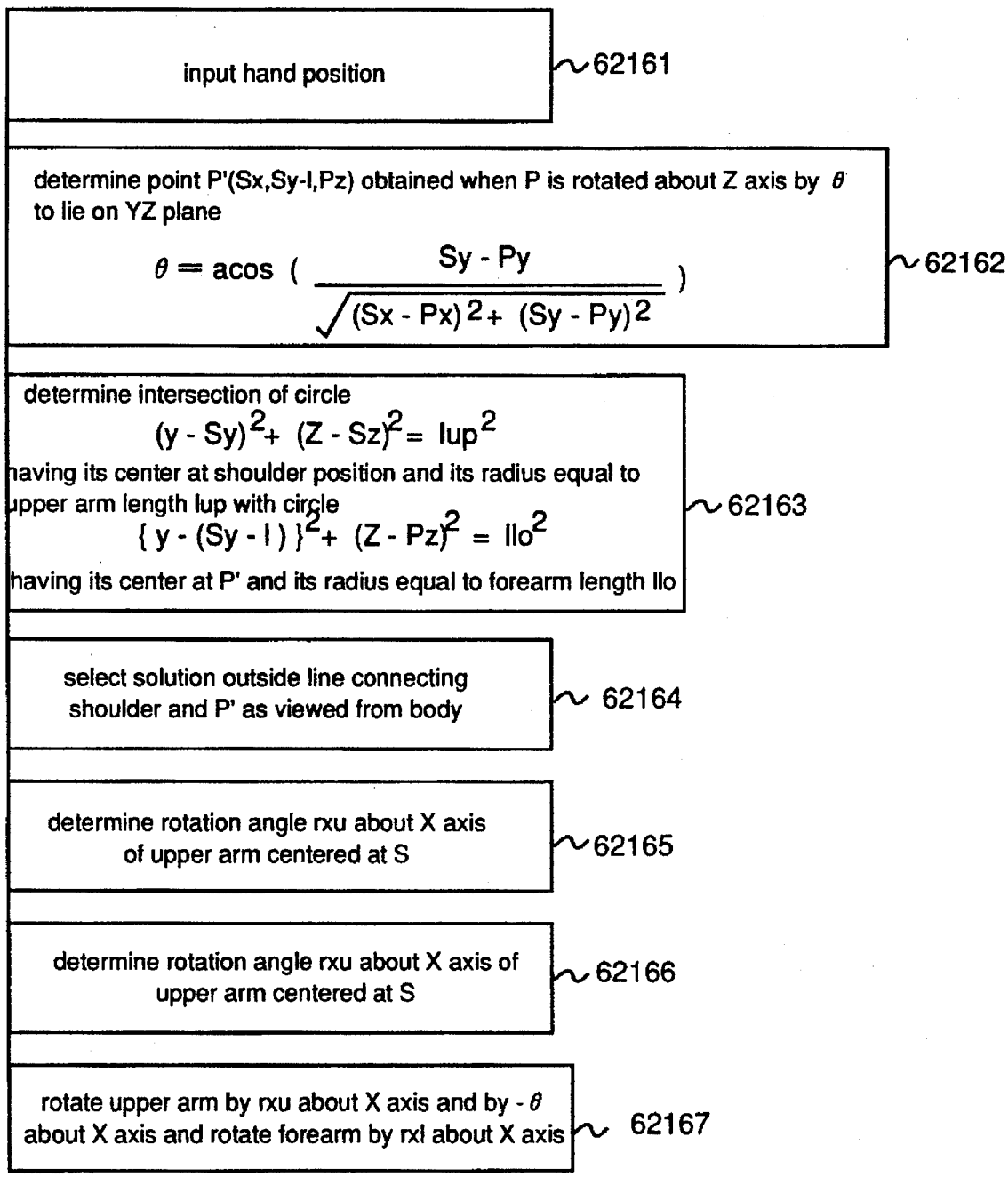
FIG. 13 shows a PAD for determination of the elbow position.
Figure 14:
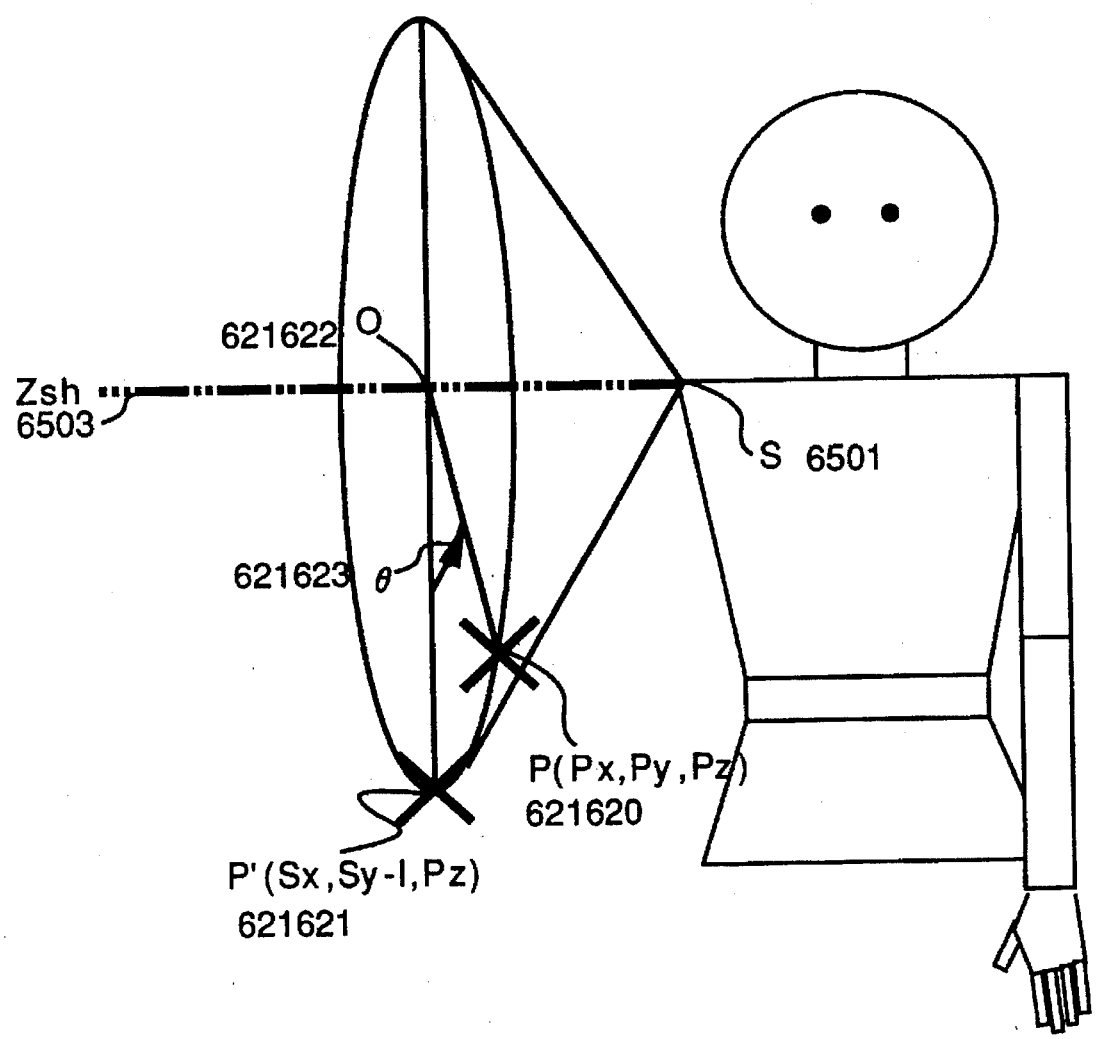
FIG. 14 shows the relation between a target point P and a virtual target point P'.
Figure 15:
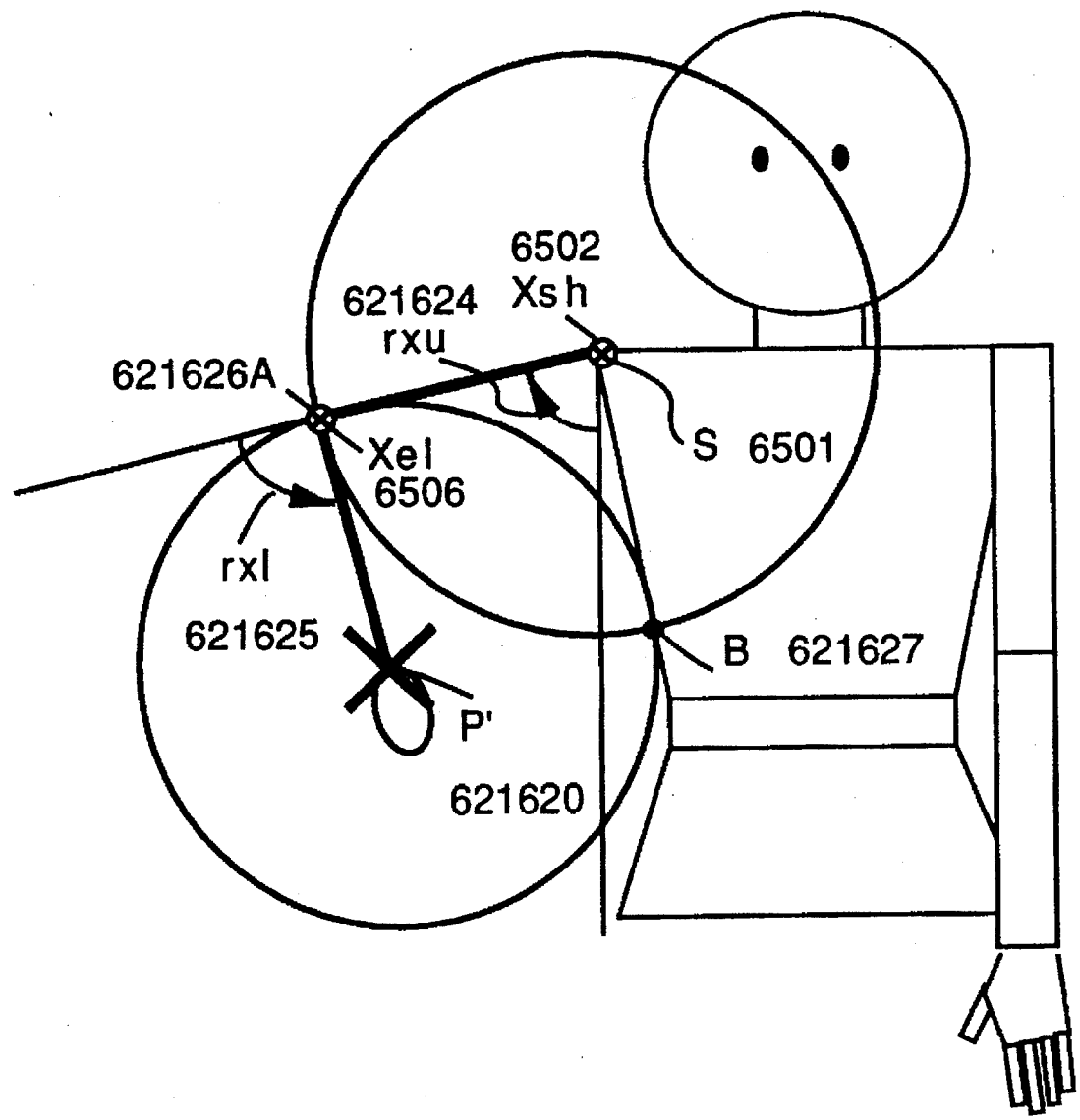
FIG. 15 shows determination of angles of the shoulder and the elbow.

Here a method of determining an elbow position in accordance with the PAD of FIG. 13 will be described. All inputted data pieces are data of sign language words converted into a conceptual position and data for interpolation inserted between words. When a position of hand P (Px, Py, Pz) 621620 as shown in FIG. 14 is inputted (62161), a position P'621621 obtained when the P621620 is rotated about Zsh6503 to lie on the YZ plane and a rotation angle θ 621623 of the P621620 are determined (62162). Next, the intersection of a circle having its center at a position of shoulder S (Sx, Sy, Sz) 6501 and its radius equal to the length 1up6510 of the upper arm with a circle having its center at the P 621621 and its radius equal to the length 1lo6511 of the forearm is determined (62163). As shown in FIG. 15, the intersection can be obtained at two points A621626 and B621627 but under the aforementioned condition (b) (the elbow position does not go toward the body beyond a line connecting a position at which the root of elbow lies and a position of hand), the point A621626 which is outside a line connecting the S6501 and the P 621621 as viewed from the body is selected (62164). Since the elbow position has been determined through this, a rotation angle rxu621624 of the upper arm about the Xsh6502 and a rotation angle rxl621625 of the forearm about the center at Xel6506 are determined (62165). Finally, when the upper arm is rotated about the Xsh6502 by rxu621624 and about the Zsh6503 by −θ621623 and the forearm is rotated about the Xel6506 by rxl621625, the hand reaches a target position P621620 (62166, 62167). In the succeeding human body model building unit 63, a human body model is built in consideration of both of the arrangement of polygons of the fundamental posture stored in the human body model constituent parts storing unit 65 and the angles of the joints of elbow and shoulder determined as above.

Figure 16:
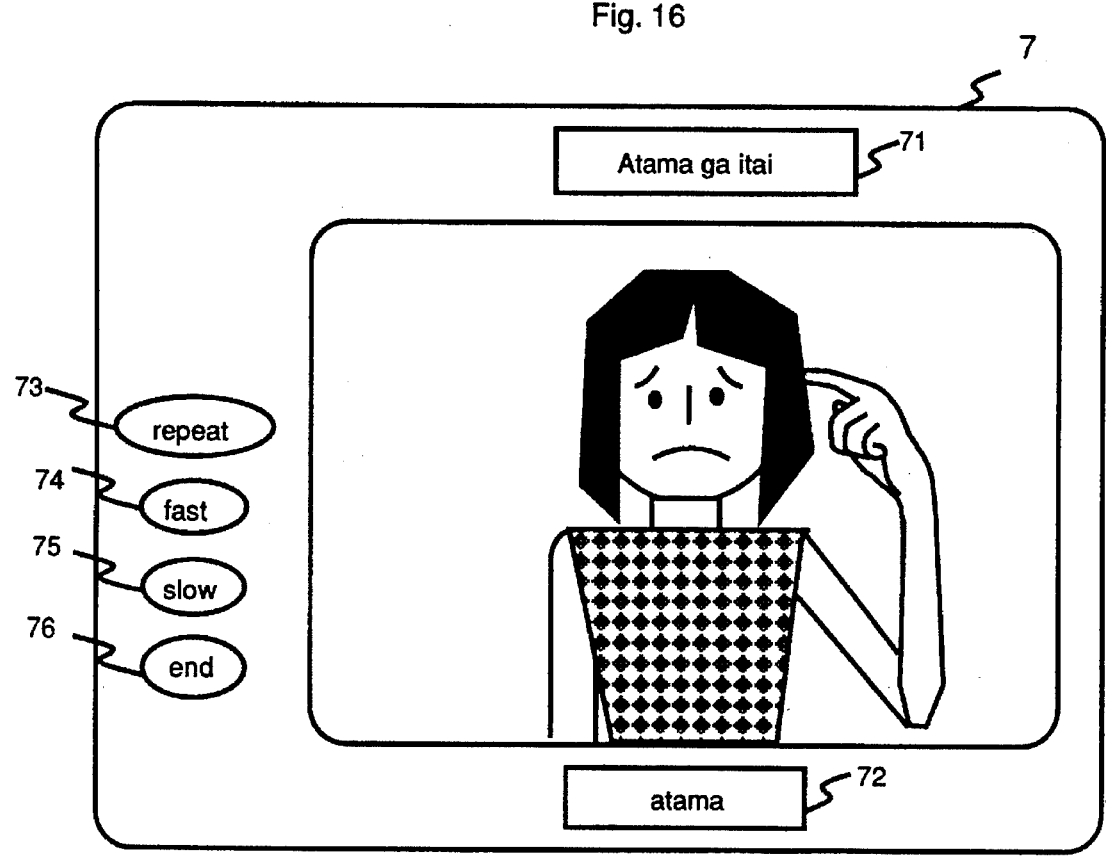
FIG. 16 shows the construction of a display picture.

A display example of sign language animation is shown in FIG. 16. Displayed at 71 is a kana and kanji coexistent sentence (here "Atama ga itai") and at 72 is a word ("atama") indicated by the animation presently displayed on the screen. Denoted by 73 to 76 are input areas for changing the method for display of animation of which 73 is an input/output area for redisplay of animation, 74 is an input/output area for accelerating the display speed, 75 is an input/output area for decelerating the display speed and 76 is an input/output area for stopping display.

Next, a method of registering a sign language word CG pattern will be described with reference to FIG. 1. Here an example in which a sign language word CG pattern purporting "atama" is registered will be described. Firstly, a person who wants to register a sign language word CG pattern wears the glove type sensor 8 and performs a sign language purporting "atama". While the sign language is performed, the glove type sensor 8 detects data of a position of hand, a direction of hand and angles of the first and second joints of finger every 1/30 seconds and sends the data to the glove type sensor interface unit 9. In the glove type sensor interface unit 9, the data is converted into a form recognizable by the computer and the converted data is registered in the sign language word CG pattern storage 10. Also, portrait data for generating the fundamental looks such as "ureshii" "kanashii" and "kutsu da" are prepared by combining polygons, added with titles and stored in the sign language word CG pattern storage 10.

Figure 17:
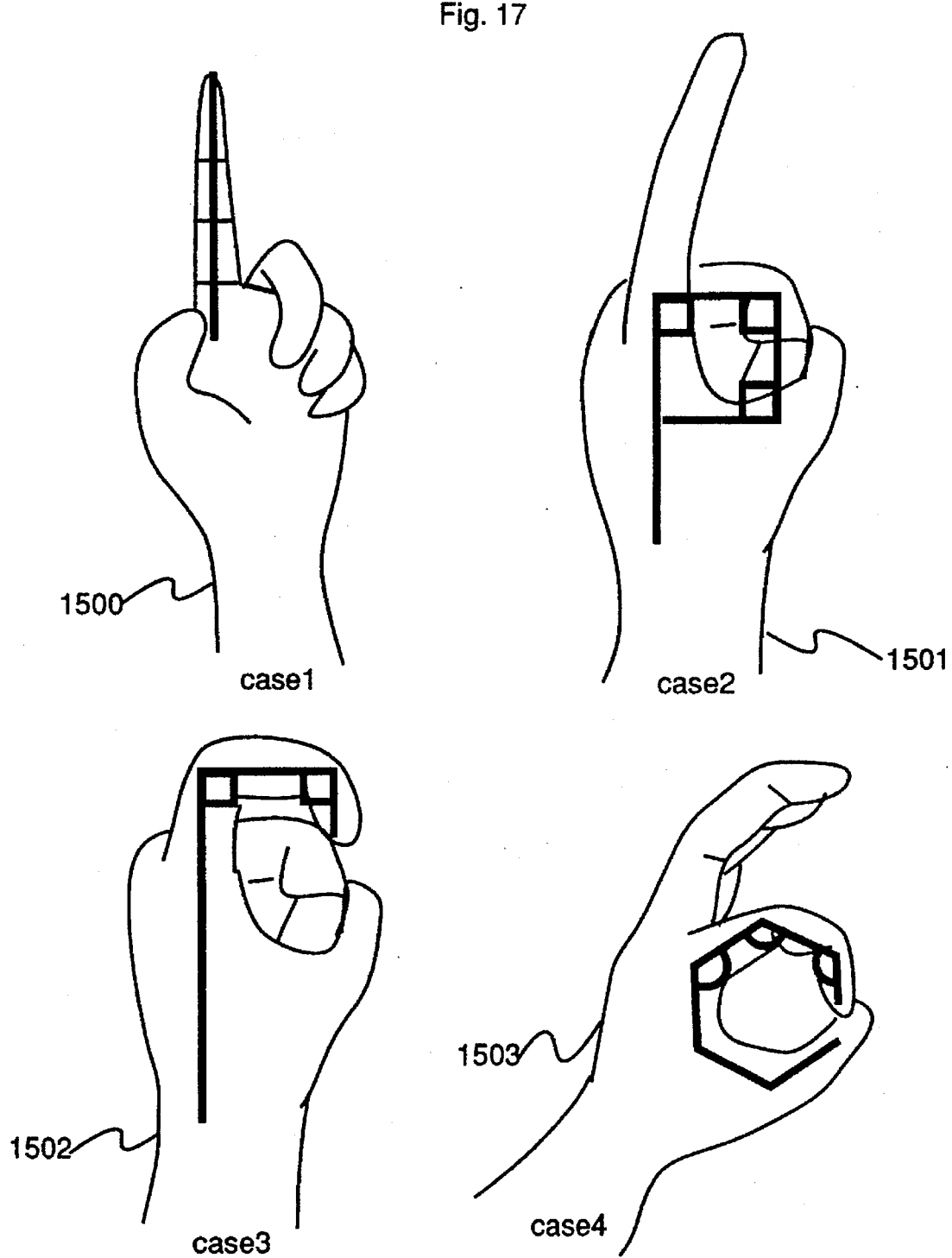
FIG. 17 shows a fundamental five-pattern I for correction of finger joint angles.
Figure 18:
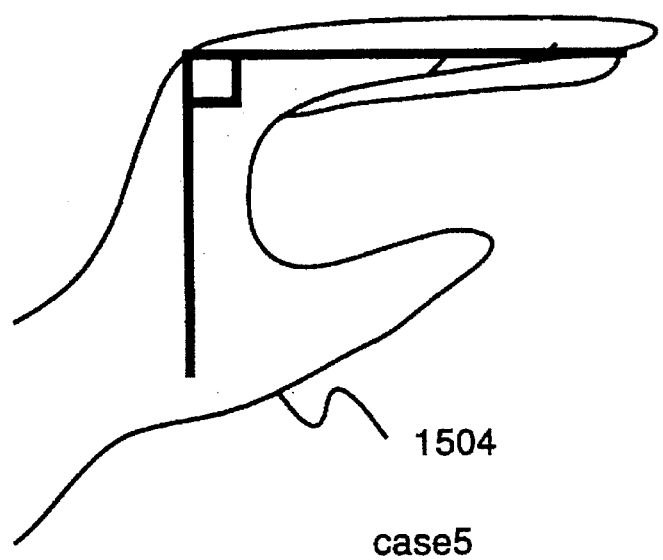
FIG. 18 shows a fundamental five-pattern II for correction of finger joint angles.

Finally, a method of correcting the sign language word CG pattern collected through the aforementioned method will be described. A method of correcting the angle of the finger joint will first be described. Since the shape of a finger which is held for a relatively long time behaves as an important key in recognizing a sign language, the shape of the finger having the long hold time will first be corrected. In that case, the angle of the finger joint is principally classified into three and an angle after correction is determined by making correspondence of each finger to any one of five fundamental patterns of finger shape shown in FIGS. 17 and 18. This classification is chosen in accordance with the following criteria. Firstly, due to the fact that in performing sign languages, a finger is shaped such that the angle is the same for the first and second joints, the shape of finger is classified in accordance with the relation between the first and second joints. Secondly, the angle of joint considered to be necessary for indicating different information pieces includes 0° for indicating that the finger is straight, 90° for indicating that the finger is bent and 60° necessary to draw a circle by using the thumb and another finger. In accordance with the above criteria, the shape of finger can be classified into five patterns as shown in FIGS. 17 and 18.

Figure 20:
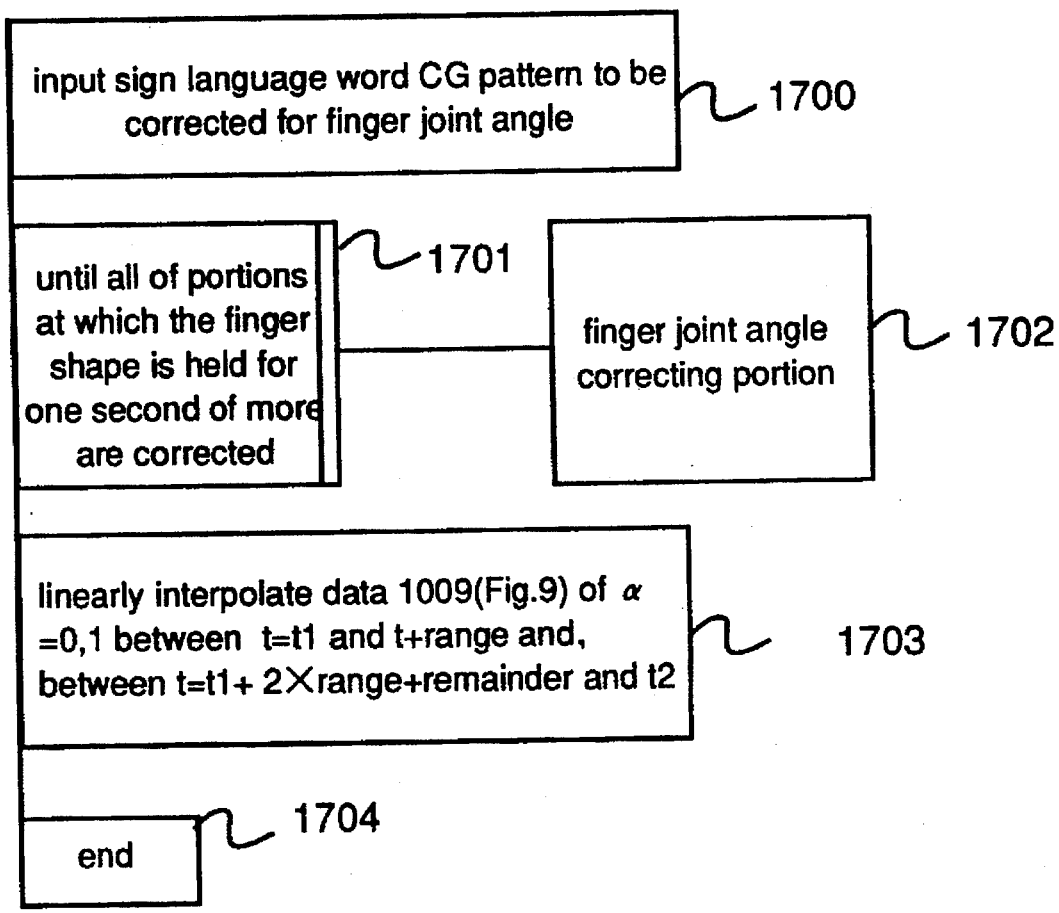
FIG. 20 shows a PAD for correction of finger joint angles.
Figure 21:
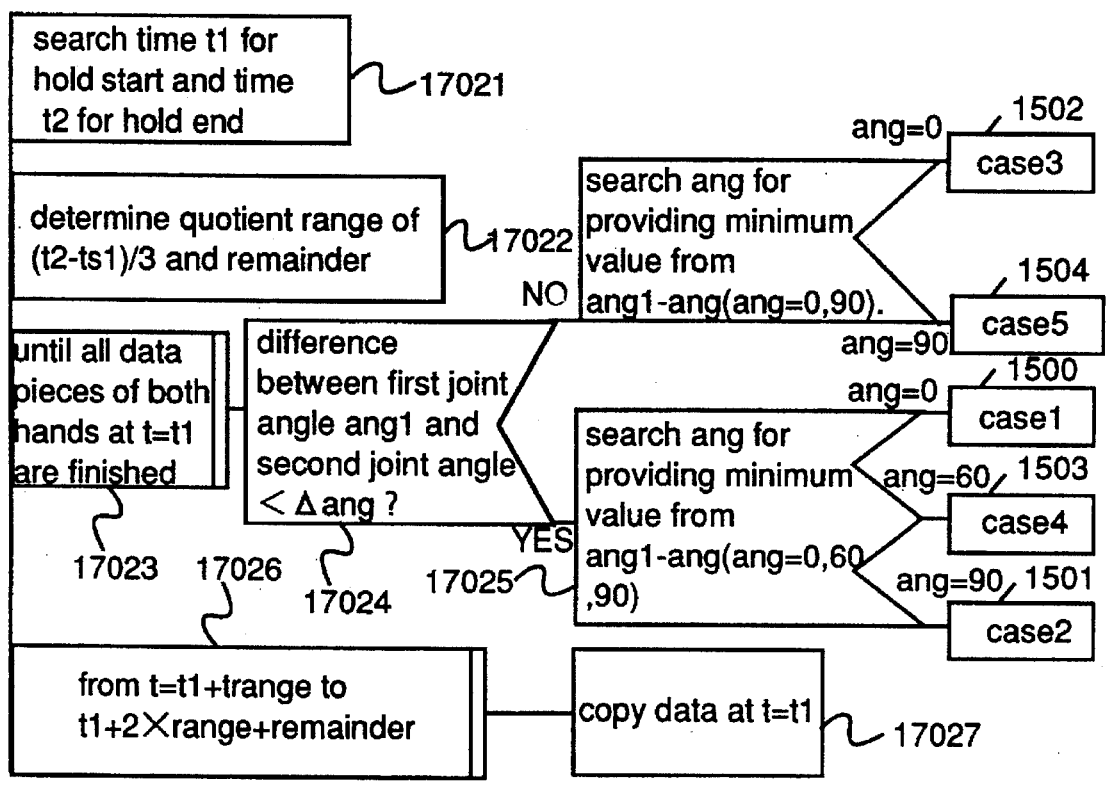
FIG. 21 shows a PAD for finger joint correction.

By using these patterns, data of the finger joint of the sign language word CG pattern is corrected in accordance with flow charts shown in FIGS. 20 and 21. When a sign language word CG pattern desired to be corrected is inputted (1700), a portion at which the finger shape is held for one second or more is searched (1701). Then, the processing of a finger joint angle correcting portion is carried out (1702).

Time t1 for start of holding of the finger shape and time t2 for hold end are stored (17021 in FIG. 21). The interval between t1 and t2 is divided into three areas, that is, an interpolation area 1, a hold area and an interpolation area 2. A remainder of the division by three is herein included in the hold area (17022 in FIG. 21). A difference between a first joint angle angl1 and a second joint angle is determined in connection with t1 data of both hands shown at 1009 in FIG. 10 (17024 in FIG. 21), and when the difference exceeds Δang and the first joint angle approximates 90°, the first joint is set to 90°, the second joint to 0° and the third joint to 0° as shown at 1504 of case 5 in FIG. 18, and when the first joint angle approximates 0°, the second and third joint angles are set to 90° as shown at 1502 of case 3 in FIG. 18. On the other hand, when the difference is below Δang, any one of states indicated at 1500 of case 1, at 1503 of case 4 and at 1501 of case 2 in FIG. 18 is set depending on which angle of 0°, 60° and 90° the first joint angle approximates (17025 in FIG. 21). This processing is repeated until all data pieces t1 of both hands are finished (17023 in FIG. 21).

Data 1009 of the finger joint angle (see FIG. 10) determined as above is copied to an area where the finger shape is held (17026, 17027). Finally, the interval between data at time t=t1−1 and data at the beginning of the hold area is interpolated and the data 1009 (see FIG. 10) is registered for the interpolation area 1. Similarly, the interval between data at the end of the hold area and data at t=t2+1 is interpolated and registered for the interpolation area 2 (1703). The above operation is carried out for all fingers of both hands during the interval of time t=t1 to t=t2 in which the finger shape is held.

Figure 19:
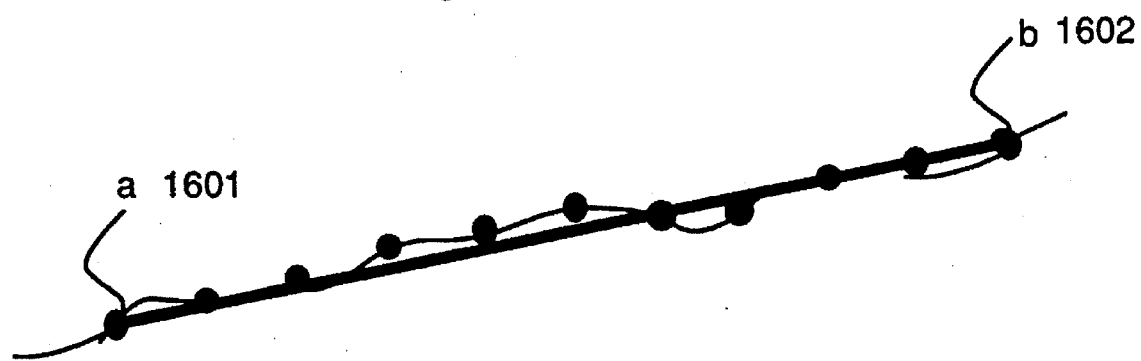
FIG. 19 shows correction of a vibration of position coordinates of the hand.

Next, a method of eliminating noise contained in coordinates of the finger position will be described. The method is shown in FIG. 19. It is now assumed that noise as represented by a curve in FIG. 19 interrupts during a time interval from t=a1601 to t=b1602. If the hand of the human body model is displayed under this condition, then unnatural fine motion will be displayed. Thus, the curve is approximated by straightforwardly connecting a1601 and b1602 by a thick straight line as shown in FIG. 19.

As described above, according to the first embodiment of the present invention, by constraining the elbow position, the elbow position can be determined definitely and a sign language, which is not unnatural, can be displayed in the form of a CG animation through a small amount of calculation. Also, since animation of one sign language word is generated in the form of a three-dimensional color animation on the basis of data of actual motion of the hand collected by using the glove type sensor, motion of the hand can be more natural. Also, when data of hand fingers collected by using the glove type sensor is corrected to effect bending which is somewhat more exaggerated than in the case of bending effected in practical sign languages, the shape of fingers can be recognized even when the hand is displayed in a far smaller size than the size of the human hand. Further, by displaying a look matching a sign language, displays of sign languages having different meanings can be effected with the same form, so that by inclining the neck to turn the eyes upon a direction matching a situation of interest, a spatial point which a receiver of the sign language should notice can be clarified. By virtue of the above expedients, the sign language becomes easy to read, errors in reading can be reduced and load on the receiver can be mitigated. It is to be noted that the human body model used here is reported in Key Frame Animation of Multi-joint Structure Applied with Dynamics by Arai, Graphics and CAD, 57-3 (1992).

Next, a second embodiment of the present invention will be described. The second embodiment is concerned with a sign language interpretation apparatus comprising an apparatus for recognition of sign languages from an aurally handicapped person to an aurally normal person in addition to the apparatus for generation of sign languages from an aurally normal person to an aurally handicapped person which has been described as the first embodiment. According to the second embodiment, in the sign language interpretation apparatus, results of translation of an inputted sign language or an inputted voice language can be confirmed easily by the individual input persons and an error in results of translation can be modified rapidly to ensure smooth communication.

The second embodiment of the present invention will be described with reference to FIGS. 22 and 23.

Figure 22:
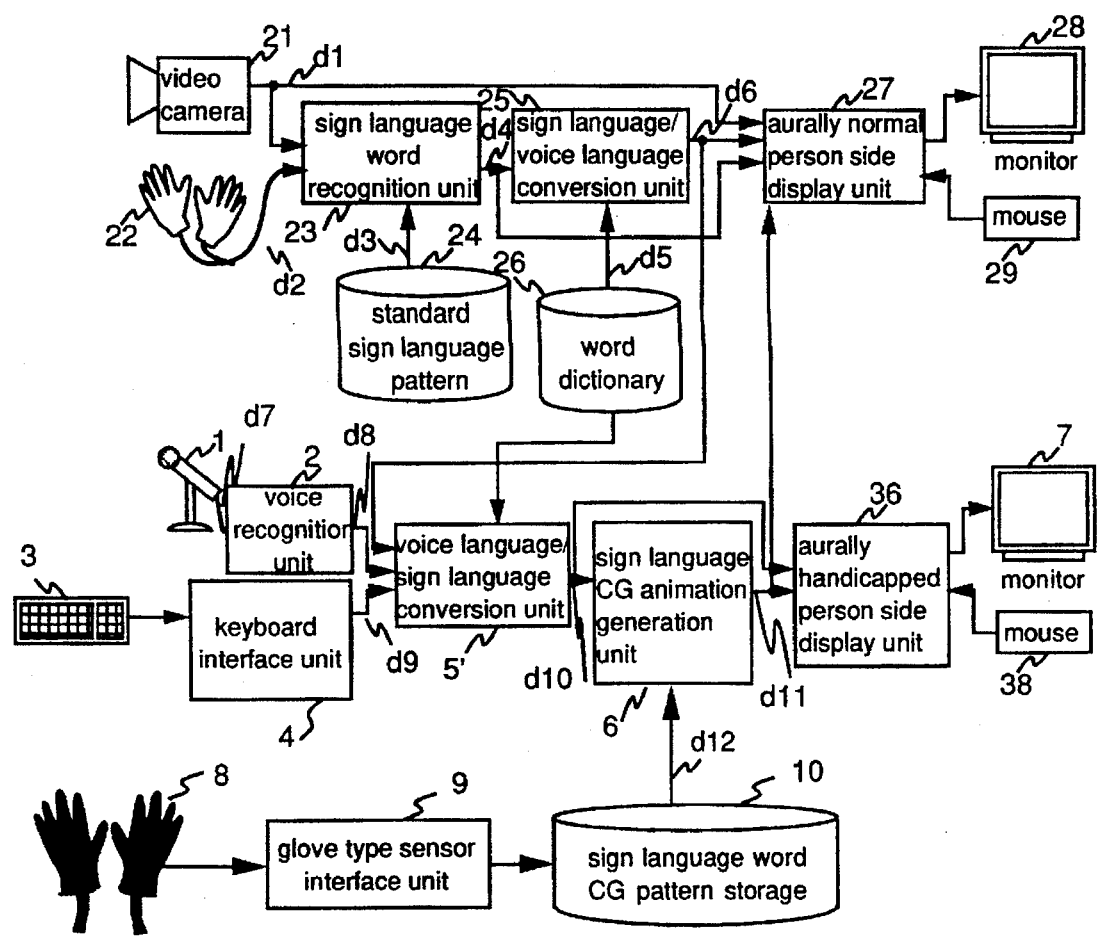
FIG. 22 is a diagram showing the construction of a sign language interpretation apparatus according to the present invention.
Figure 23:
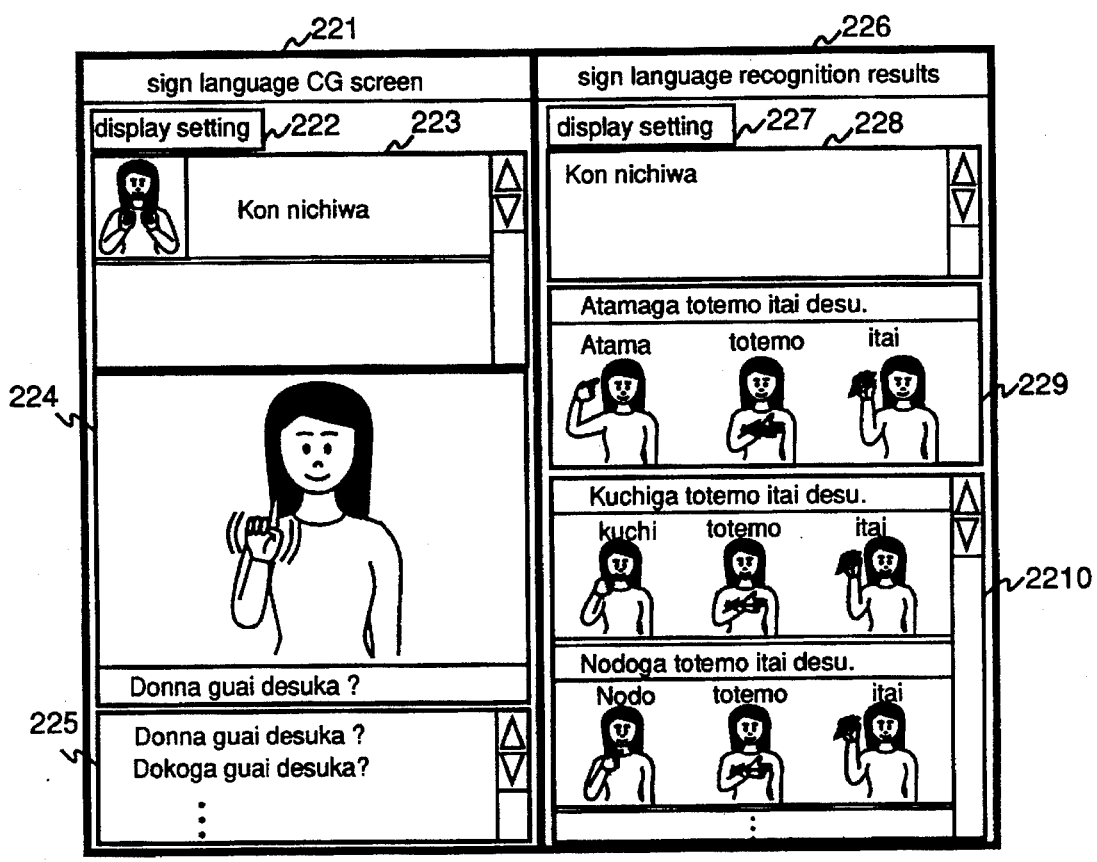
FIG. 23 shows an example of a display picture in the sign language interpretation apparatus according to the present invention.

FIG. 22 is a diagram showing the construction of the sign language interpretation apparatus according to the second embodiment of the present invention, and FIG. 23 shows an example of the display picture of the sign language interpretation apparatus.

In FIG. 22, in the sign language recognition apparatus, reference numeral 21 designates a video camera for inputting a sign language inputted by an aurally handicapped person in the form of an image, 22 a glove type sensor for inputting motion of the hand in a sign language, 23 a sign language word recognition unit for recognizing sign language words from a portion of look and motion of the hand in the sign language image, 24 a standard sign language pattern storage used by the sign language word recognition unit 23, 25 a sign language/voice language conversion unit adapted to perform a spoken language processing for translation of a series of recognized sign language words into a sentence in voice language, 26 a word dictionary storage used in the sign language/voice language conversion unit 25 and a voice language/sign language conversion unit 5' to be described later, 27 an aurally normal person side display unit for indicating results of translation of sign language into voice language to the aurally normal person and for performing setting of a display method and modification of display results, 28 a monitor (three-dimensional indication display) for displaying outputs of the aurally normal person side display unit, and 29 a mouse for manipulating display results.

In the sign language generation apparatus, reference numeral 1 designates a microphone used by the aurally normal person to input a voice, 2 a voice interface unit for recognizing the inputted voice, 3 a keyboard for inputting a sentence in the form of letters, 4 a keyboard interface unit, 5' the voice language/sign language conversion unit adapted to perform a spoken language processing for translation of the inputted sentence in voice language into a series of sign language words, 6 a sign language CG animation generating unit for generating sign language CG from the series of sign language words delivered out of the voice language/sign language conversion unit 5', 10 a sign language word CG pattern storage used in the sign language CG animation generating unit 6, 36 an aurally handicapped person side display unit for indicating results of translation of voice language into sign language to the aurally handicapped person and for performing setting of a display method and modification of display results, 7 a monitor (three-dimensional indication display) for displaying outputs of the aurally handicapped person side display unit 36, and 38 a mouse for manipulating display results.

As the units 29 and 38 for manipulating display results, an input unit such as a touch panel may be used in addition to the mouse. It is to be noted that individual means 1 to 10 are constructed substantially similarly to those of the sign language generation apparatus of FIG. 1 described in connection with the explanation of the first embodiment.

In FIG. 23, reference numeral 221 designates a display area of results of translation of voice language into sign language, 222 a button adapted to display a menu for setting a method of displaying the results of translation of voice language into sign language, 223 a display area of a history of results of translation of voice language into sign language, 224 a display area of a first candidate in the results of translation of voice language into sign language, 225 a display area of a candidate other than the first candidate in the results of translation of voice language into sign language, 226 a display area of translation results of sign language into voice language, 227 a button adapted to display a menu for setting a method of displaying the results of translation of sign language into voice language, 228 a display area of a history of results of translation of sign language into voice language, 229 a screen for display of a first candidate in the results of translation of sign language into voice language, and 2210 a screen for display of a candidate other than the first candidate in the results of translation of voice language into sign language.

Image data d1 inputted by the video camera 21 and hand motion data d2 inputted by the glove type sensor 22 are inputted to the sign language word recognition unit 23 and compared and collated with a standard sign language pattern d3 to permit recognition of sign language words expressed in the inputted data. As a detailed method for recognition in the sign language word recognition unit 23, a method can be utilized which is described in, for example, an application referred to as a related application, that is, U.S patent application No. 08/111,380 entitled "Sign Recognition Apparatus and Method and Sign Translation System Using Same" filed on Aug. 24, 1993 (claiming the Convention Priority based on Japanese patent application 04-051300 filed on Aug. 24, 1992, Japanese patent application 04-235633 filed on Sep. 3, 1992 and Japanese patent application 04-51300 filed on May 10, 1992) which is a continuation-in-part application of U.S. patent application No. 08/029,046 entitled "Sign Language Translation System and Method" filed on May 9, 1993. Without using the glove type sensor as the input unit of sign language, inputting may be relied on the video camera alone and motion of the hand may be recognized from an image.

The sign language word recognition unit 23 delivers a recognized sign language word series d4 which in turn is inputted to the sign language/voice language conversion unit 25. In respect of the sign language series d4, the sign language/voice language conversion unit 25 analyzes the meaning relation between words by utilizing a word dictionary d5, generates a sentence in voice language by supplementing particles and inflections and delivers a generated sentence d6. As a detailed method for translation in the sign language/voice language conversion unit 25, a method can be utilized which is described in, for example, an application referred to as a related application, that is, U.S. patent application No. 08/029,046 entitled "Sign Language Translation System and Method" filed on May 9, 1993.

The sentence d6 is inputted to the aurally normal person side display unit and the voice language/sign language conversion unit 5' to be described later. The aurally normal person side display unit 27 is applied with the sign language image 1 inputted from the video camera 21, the sign language word series candidate d4 recognized by the sign language word recognition unit 23, the voice language sentence candidate d6 generated by the sign language/voice language conversion unit 25 and the sign language CG image candidate d11 generated by the sign language CG animation generating unit 6 to determine a combination of them in accordance with setting by the user and to perform display.

Figure 24:
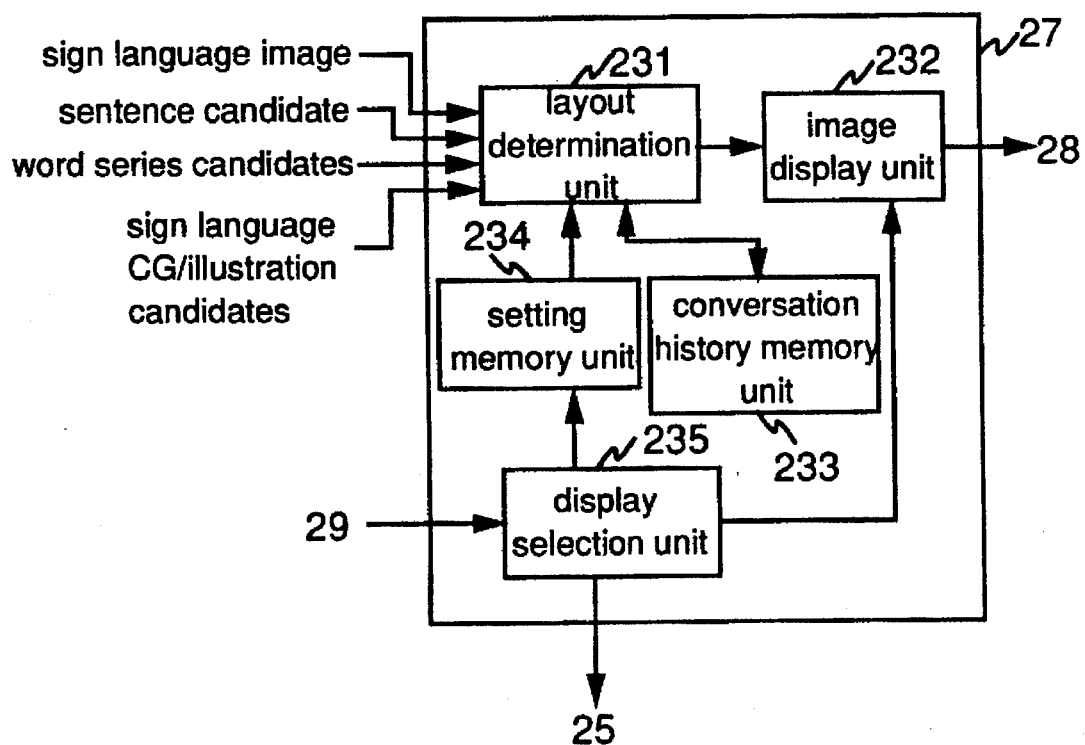
FIG. 24 is a diagram showing the construction of an aurally normal person side display unit.

Details of the aurally normal person side display unit 27 will be described with reference to FIGS. 24 to 28. FIG. 24 is a diagram showing the construction of the aurally normal person side display unit 27, FIG. 25 shows a data format of results d6 of translation of sign language into voice language, FIG. 26 shows a data format of the sign language word series candidate d4, FIG. 27 shows a data format of a sign language CG candidate d11, and FIG. 28 shows a data format of the sign language image d1.

In FIG. 24, reference numeral 231 designates a layout determining unit, 232 an image display unit, 233 a conversation history memory unit, 234 a setting memory unit and 235 a display selection unit. In FIG. 25, reference numeral 241 designates the number of candidates representing the number of sentence candidates, 242 actual sentence candidates, 243 a candidate number for making correspondence to the word series candidate and the sign language CG candidate, and 244 sentences of the respective candidates.

In FIG. 26, reference numeral 251 designates the number of candidates representing the number of word series candidates, 252 actual word series candidates, 253 a candidate number, 254 the number of words contained in respective candidates, 255 actual sign language words contained in the respective candidates, 256 the number of names of words in voice language corresponding to the sign language, and 257 word names.

Figure 27:
FIG. 27 shows a data format of sign language CG candidates.
Figure 28:
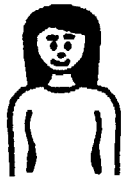
FIG. 28 shows a data format of sign language images.
Figure 28:
Figure 28:

In FIG. 27, reference numeral 261 designates the number of candidates representing the number of sign language CG candidates, 262 actual sign language CG candidates, 263 a candidate number, 264 the number of sign language words contained in respective candidates, 265 the number of expressions when there are a plurality of sign language expressions, 266 the number of data pieces of a sign language image, 267 sign language image data, 268 a data number used when an illustration display is carried out, and 269 image data representative of, for example, a locus of motion of the hand which is added to the sign language image when the illustration display is carried out. As the data for illustration, part of the CG image may not be used but another image data may be prepared and used.

In FIG. 28, reference numeral 271 designates the number of sign language images and 272 actual sign language image data.

The layout determining unit 231 first stores the sign language image d1, sentence candidate d6, sign language word series candidate d4 and sign language CG candidate d11 in the conversation history memory unit 233. Then, it determines a sentence candidate, a sign language word series candidate, a sign language CG candidate and a layout of a sign language image on the basis of display setting data by the user stored in the setting memory unit 234, and sends necessary image data to the image display unit 232. The image display unit 232 effects display of the image data sent from the layout determining unit 231 on the monitor.

The display selection unit responds to the mouse to detect which display on the screen is selected and performs a necessary processing. By selecting the display setting button 222 of FIG. 23 by means of the mouse, a display setting picture shown in FIG. 29 is displayed. In FIG. 29, reference numeral 281 designates a button for ending the setting, 282 a column for indicating a state as to whether respective items are set in the display of the first candidate, 283 respective items, 284 a column for indicating a state as to whether respective items are set in the display of a candidate other than the first candidate, and 285 respective items.

In the display selection picture of FIG. 29, when the columns 282 and 284 indicative of selection states and the respective display items 283 and 285 are selected by the mouse, if the respective items are not set, then they are brought into set states and a mark indicative of the completion of setting is displayed in the corresponding column. When the respective items have been set, they are brought into non-set states and the mark is erased. To indicate the set case and the non-set case, change of the display form such as change of the background color may be effected in place of the display of the mark. Then, by selecting the end button 281, information about the setting is stored in the setting memory unit 234 and display is carried out in accordance with each setting.

Figure 30:
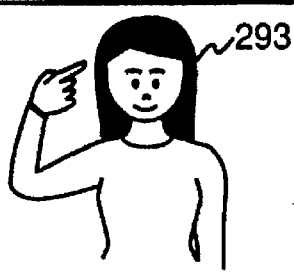
FIGS. 30A and 30B show an example of the display picture (sign language CG display) of the aurally normal person side display unit.
Figure 31:
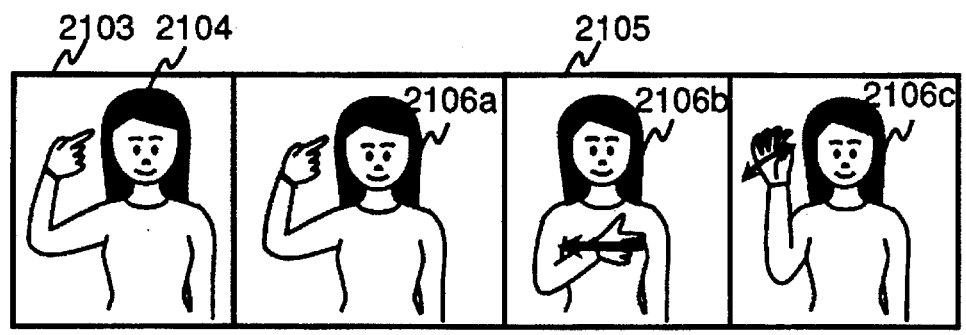
FIGS. 31A and 31B show an example of the display picture (sign language CG display and sign language illustration display) of the aurally normal person side display unit.
Figure 32:
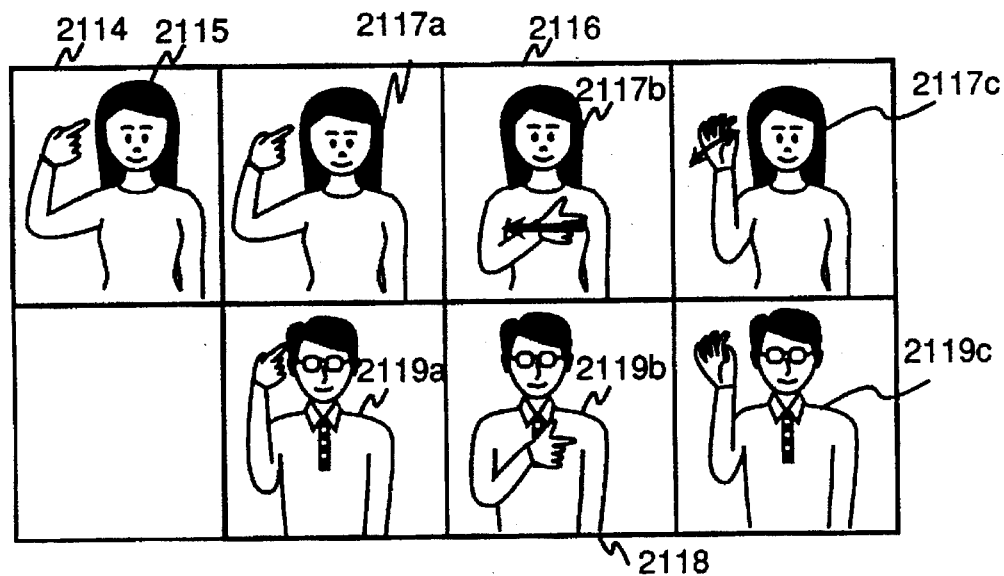
FIGS. 32A and 32B show an example of the display picture (sign language CG display, sign language illustration display and sign language image display) of the aurally normal person side display unit.
Figure 33:
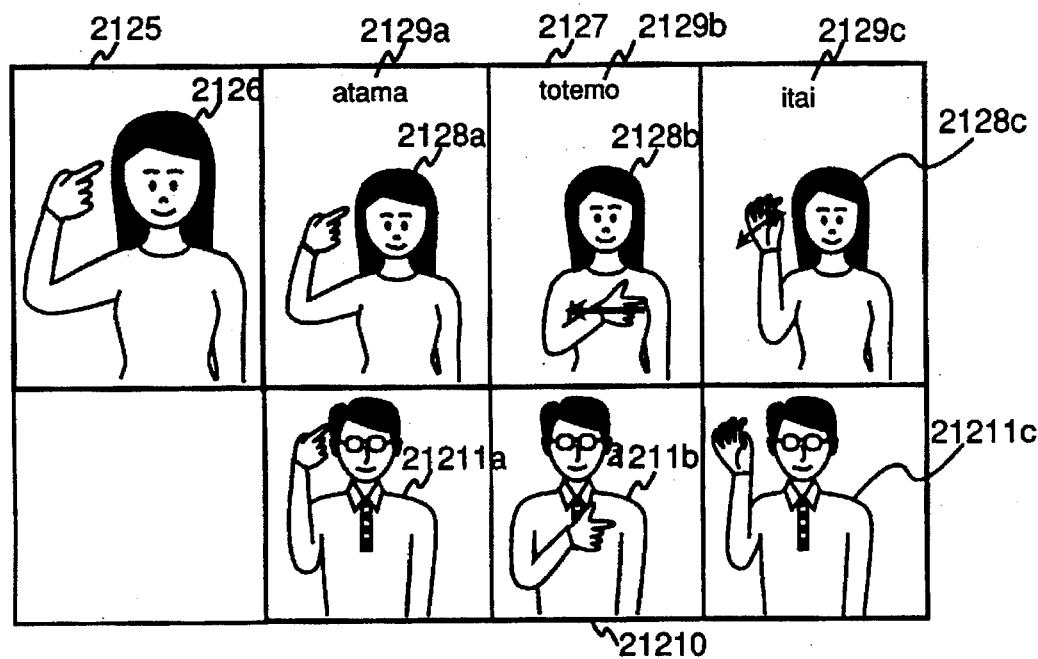
FIGS. 33A and 33B show an example of the display picture (sign language CG display, sign language illustration display, sign language image display and sign language word name display) of the aurally normal person side display unit.
Figure 34:
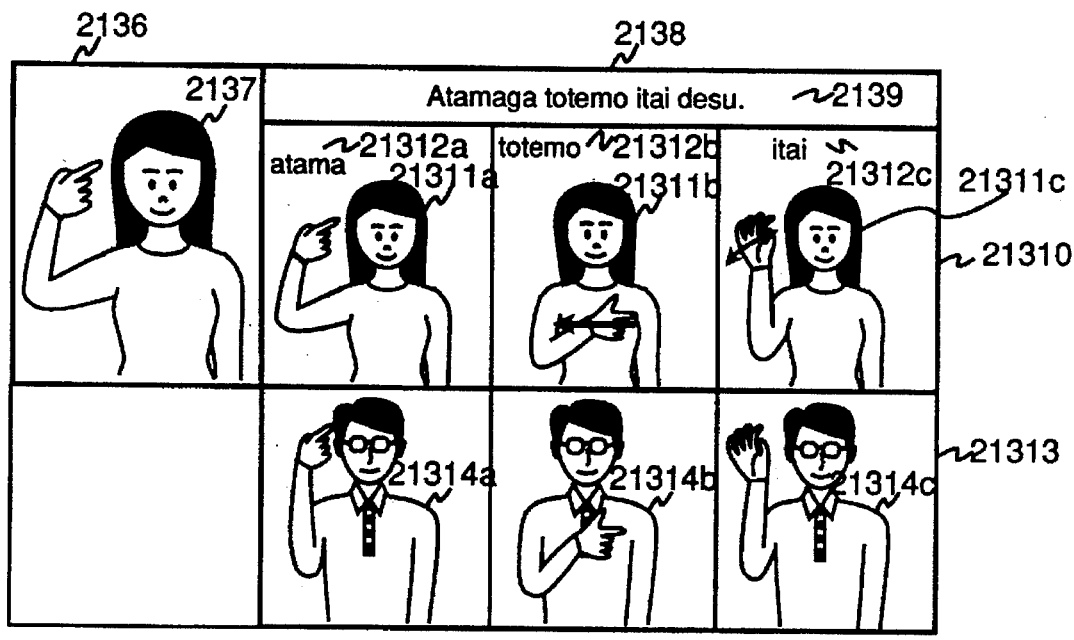
FIGS. 34A and 34B show an example of the display picture (sign language CG display, sign language illustration display, sign language image display, sign language word name display and text display) of the aurally normal person side display unit.

The display 229 of the first candidate at the aurally normal person side display unit 27 will be described with reference to FIGS. 30A and 30B to FIGS. 34A and 34B. In FIG. 30A, the display of the first candidate is set in a sign language. CG display by an indication 291 indicative of the set state. Through this, as shown in FIG. 30B, only a sign language CG 293 is displayed on the display area 292 of the first candidate. When the sign language CG display area 292 is selected by means of the mouse under the condition that the sign language CG display is finished and stopped, the display of the sign language CG is again started.

In FIG. 31A, the display of the first candidate is set to a sign language CG display and a sign language illustration display by indications 2101 and 2102 indicative of setting. Through this, as shown in FIG. 31B, a sign language CG 2104 is displayed in a sign language CG display area 2103, and sign language illustrations 2106a, 2106b and 2106c are displayed in a sign language illustration display area 2105. The sign language illustration displayed herein is an image in sign language CG data 267 in FIG. 27 which is designated by a data number 268 for illustration and which is added with additional information 269 or image data separately prepared for illustration. Also, by selecting a display area for illustration of each sign language word, CG display of each sign language word is carried out.

In FIG. 32A, the display of the first candidate is set to a sign language CG display, a sign language illustration display and a sign language image display by indications of setting 2111, 2112 and 2113. Through this, as shown in FIG. 32B, a sign language CG 2115 is displayed in a sign language CG display area 2114, sign language illustrations 2117a, 2117b and 2117c are displayed in a sign language illustration display area 2116 and sign language images 2119a, 2119b and 2119c performed by the aurally handicapped person are displayed in a sign language image display area 2118. The sign language images displayed here stem from respective sign language words obtained by dividing an original sign language image d1 on the basis of positions of words recognized by the sign language word recognition unit 23. By selecting each display area of sign language image by means of the mouse, each image can be reproduced.

In FIG. 33A, the display of the first candidate is set to a sign language CG display, a sign language illustration, a sign language image and a sign language word name display by indications of setting 2121, 2122, 2123 and 2124. Through this, as shown in FIG. 33B, a sign language CG 2126 is displayed in a sign language CG display area 2125, sign language illustrations 2128a, 2128b and 2128c and sign language word names 129a, 129b and 129c are displayed in a sign language illustration display area 2127, and sign language images 21211a, 21211b and 21211c are displayed in a sign language image display area 21210.

In FIG. 34A, the display of the first candidate is set to a sign language CG display, a sign language illustration, a sign language image, a sign language word name and a text display by indications 2131, 2132, 2133, 2134 and 2135. Through this, as shown in FIG. 34B, a sign language CG 2137 is displayed in a sign language CG display area 2136, a sentence 2139 is displayed in a text display area 2138, sign language illustrations 21311a, 21311b and 21311c and sign language word names 21312a, 21312b and 21312c are displayed in a sign language illustration display area 21310, and sign language images 21314a, 21314b and 21314c are displayed in a sign language image display area 21313.

Figure 35:
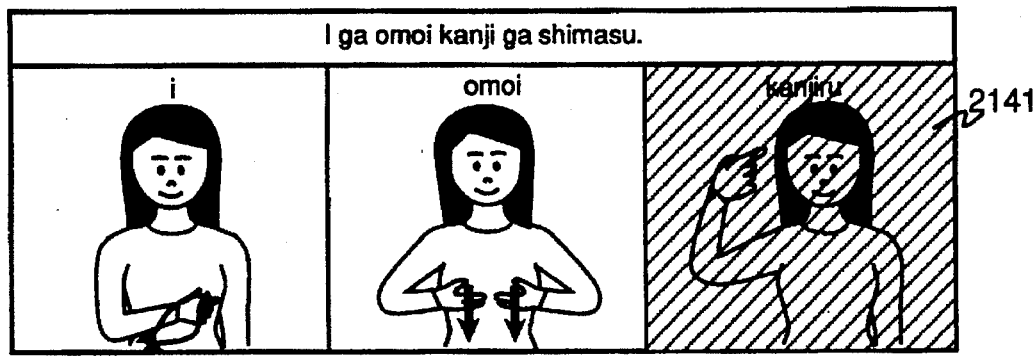
FIGS. 35A, 35B and 35C show an example of display and modification of a sign language word having a plurality of word names.
Figure 35:
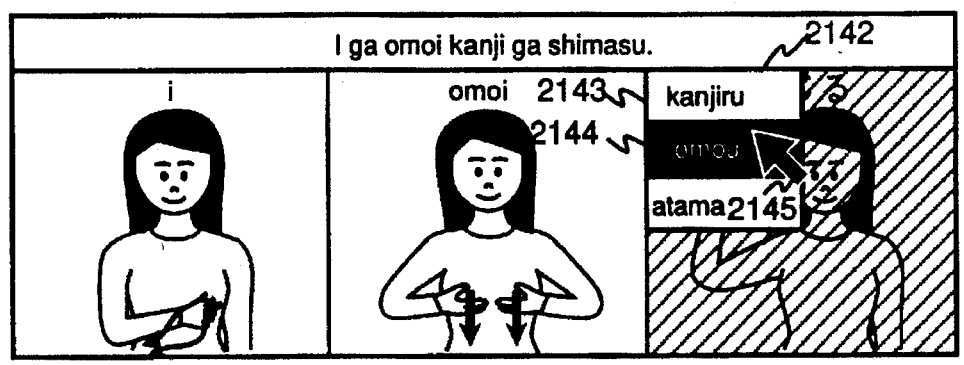
Figure 35:
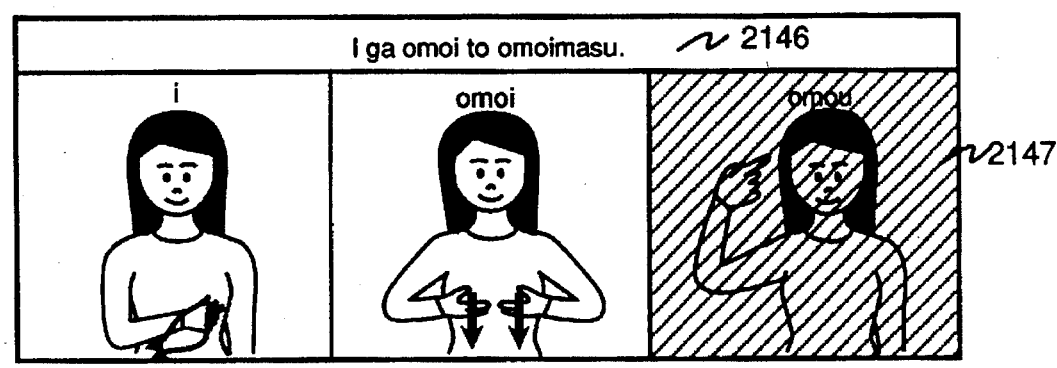

In the sign language word name display of the above displays, when a certain sign language word has a plurality of word names in voice language, a sign language word "kanjiru" (feel) 2141, for example, is displayed differently in background color from other sign language words as shown in FIG. 35A in order to make clear the fact that the particular sign language word has a plurality of word names. Instead of changing the background color, display color of the sign language illustration may be changed or a denotation indicative of the possession of a plurality of word names may be displayed in a display area of the sign language word. In FIG. 35A, when the sign language word "kanjiru" 2141 having a plurality of word names is selected by the mouse, a list 2142 of other word names is displayed. By selecting a word name desired to be used in the list by means of a mouse 2145, the word name of the sign language word can be changed as shown at 2147 in FIG. 35C. Further, when changing of the word name is effected, the display selection unit 235 of FIG. 24 informs the sign language/voice language conversion unit 25 of FIG. 22 that changing of the word name is carried out, so that a sentence using the changed word name is displayed. In FIG. 35B, in place of "kanjiru" 2143, "omou" (think) 2144 is selected and by informing the sign language/voice language conversion unit 25 of this change, a sentence "I ga omoi to omoi masu." (I think that something undigested remains in my stomach.) using "omou" is sent to the layout determining unit 231. This is displayed as shown at 2146 in FIG. 35C.

Figure 36:
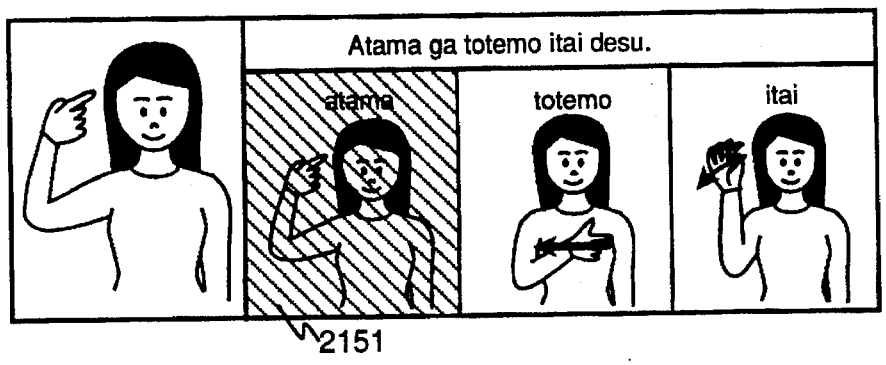
FIGS. 36A, 36B and 36C show examples of display of sign language words which match sign language CG.
Figure 36:
Figure 36:
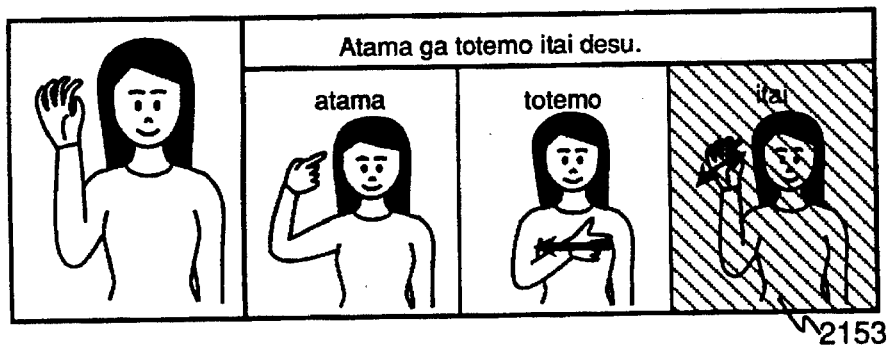

Also, when a sign language CG and a sign language illustration or a sign language word name are displayed simultaneously, the display of the sign language illustration or sign language word corresponding to the sign language CG display is changed to make clear the fact that display is being effected in sign language CG. In FIG. 36A, a sign language word "atama" 2151 is in sign language CG display and hence it is displayed while its background color is changed. In FIG. 36B, a sign language word "totemo" (very) 2152 is in sign language CG display and hence it is displayed while its background color is changed and in FIG. 36C, a sign language word "itai" 2153 is in sign language CG display and hence it is displayed while its background color is changed. The fact that display is being effected in sign language CG can be indicated by changing the display color of the sign language illustration or by displaying a sign language illustration or a sign language word name together with a denotation indicating that display is being effected, instead of changing the background color.

Figure 37:
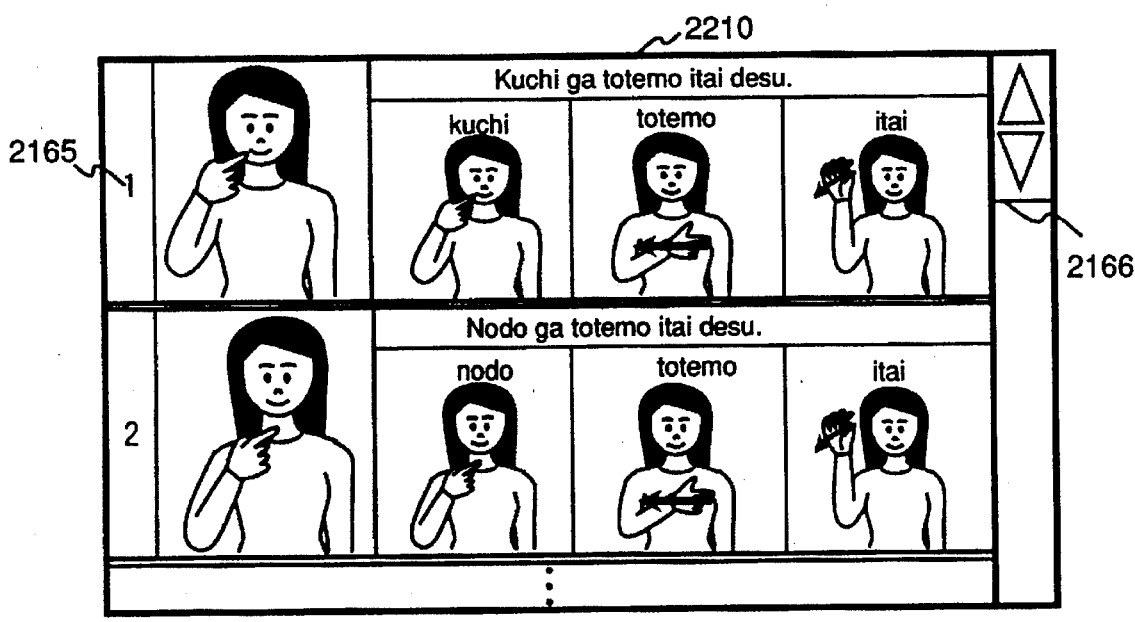
FIGS. 37A and 37B show an example of display of a candidate other than a first candidate in the aurally normal person side display unit.

A display 2210 of a candidate other than the first candidate on the aurally normal person side display unit will be described with reference to FIGS. 37A and 37B. In FIG. 37A, the display of the candidate other than the first candidate is set to a sign language CG display, a sign language illustration display, a sign language word name display and a text display by setting indications 2161, 2162, 2163 and 2164. Then, in the candidate display area 2210, a plurality of candidates are enumerated and displayed. The display form of each candidate is similar to that described in connection with the first candidate display with the exception that a candidate number 2165 is added.

Since many candidates other than the first candidate are involved, part of them are displayed on the screen in FIG. 37B. When candidates not displayed on the screen are desired to be watched, they can be watched by selecting and moving a scroll bar 2166 by means of the mouse to move the candidate display picture vertically. Then, by selecting a candidate number 2165 of each candidate by means of the mouse, a selected candidate can be displayed as a first candidate.

The function of starting the sign language CG display by selecting the sign language CG display area by means of the mouse in the display of each candidate, the function of causing each illustration to be CG displayed by selecting each illustration by means of the mouse in the sign language illustration display, and the function in the case where a sign language word has a plurality of word names in voice language are similar to those described in connection with the display of the first candidate. Further, in FIG. 37A, an image of a sign language performed by an aurally handicapped person can also be displayed, like the setting of the first candidate.

Figure 38:
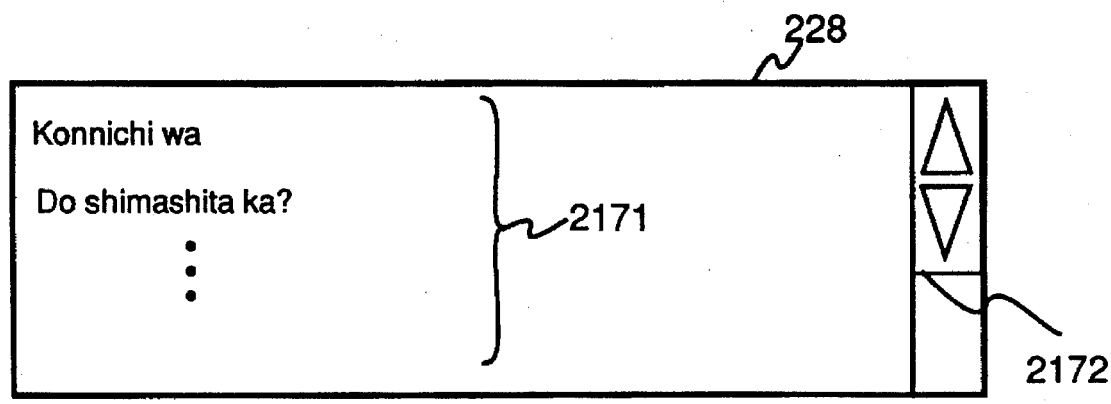
FIG. 38 shows an example of a display of conversation history in the aurally normal person side display unit.

A history display 228 of translation results on the aurally normal person side display unit will be described with reference to FIG. 38. In the display portion 228 of translation history, translation results 2171 obtained to date are displayed in order. In FIG. 38, of the results of translation of sign language into voice language, only a sentence in voice language is displayed. If necessary, the same display form as that of the first candidate or of a candidate other than the first candidate can be adopted. Alternatively, setting of a history display of translation results may be added to the display setting picture of FIG. 29 to permit a display form to be set independently of the display of the first candidate or of a candidate other than the first candidate. Also, in the history display 228, by selecting and vertically moving a scroll bar 2172 by means of the mouse, translation results not displayed on the screen can be confirmed.

Next, in FIG. 22, a voice d7 inputted through the microphone 1 is recognized by the voice recognition unit 2 and translated into a sentence d8 in voice language. A direct sentence d9 can also be inputted using the keyboard 3. The sentence d8 or d9 in voice language is sent to the voice language/sign language conversion unit 5' and translated into a sign language word series d10 composed of sign language word names and position information necessary for sign language expression. Further, in the sign language CG animation generating unit 6, sign language CG is generated using a sign language image data d12. Examples of the detailed construction of the voice language/sign language conversion unit 5' and sign language CG animation generating unit 6 are the same as those described in connection with the previous first embodiment. The aurally handicapped person side display unit 36 is applied with a voice or a sentence candidate in voice language inputted from the keyboard, a sign language word series candidate d10 as a result of translation by the voice language/sign language conversion unit 5', a sign language CG image corresponding to a voice language sentence and generated by the sign language CG animation generating unit 6 and a CG image candidate d11 of each sign language word, and it determines a combination of these inputs in accordance with a setting by the user and displays the combination.

Figure 39:
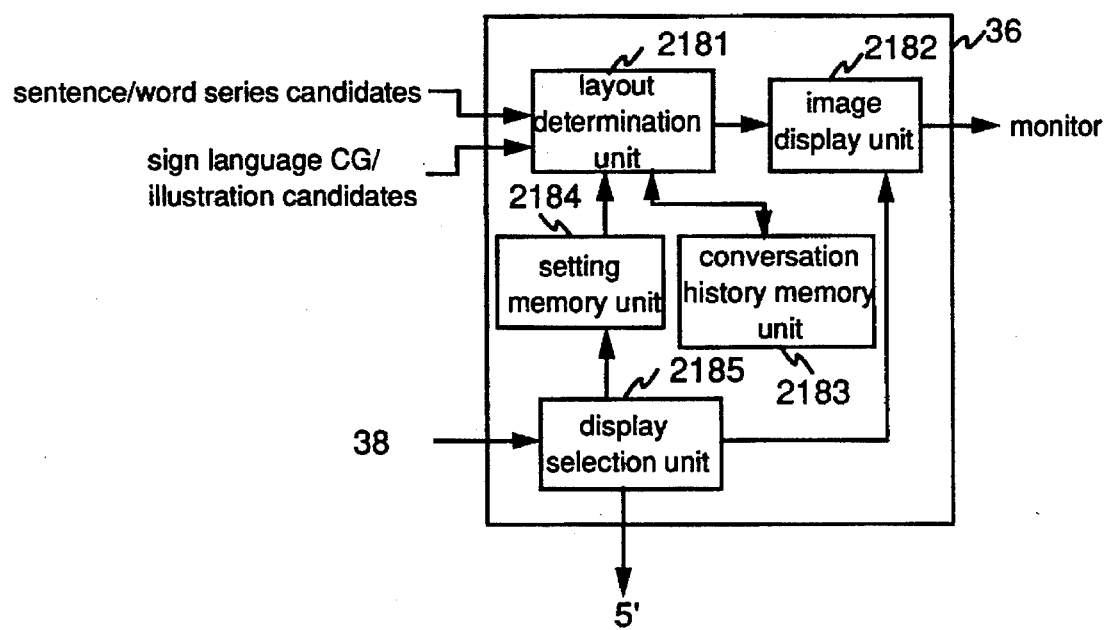
FIG. 39 is a diagram showing the construction of an aurally handicapped person side display unit.

Details of the aurally handicapped person side display unit 36 will be described with reference to FIG. 39. The construction of the aurally handicapped person side display unit is essentially the same as the construction of the aurally normal person side display unit shown in FIG. 24. In FIG. 39, reference numeral 2181 designates a layout determining unit, 2182 an image display unit, 2183 a conversation history memory unit, 2184 a setting memory unit and 2185 a display selection unit. The layout determining unit 2181 determines a layout of sentence/sign language word series candidates and sign language CG/illustration candidates on the basis of display setting data by the user stored in the setting memory unit 2184, and sends necessary image data to the image display unit 2182. The image display unit 2182 causes the image data sent from the layout determining unit 2181 to be displayed on the monitor. The display selection unit detects which display on the screen is selected by the mouse and performs necessary processings. By selecting the display setting button 227 of FIG. 23 by means of the mouse, a display setting picture as shown in FIG. 40 is displayed. The function of the display setting picture of FIG. 40 is the same as that of the display setting picture of the aurally normal person side display unit in FIG. 29. In FIG. 40, however, the sign language image display of the first candidate display and the sign language CG display of candidates other than the first candidate in FIG. 29 are omitted. If necessary, a sign language CG display may be added here.

Figure 41:
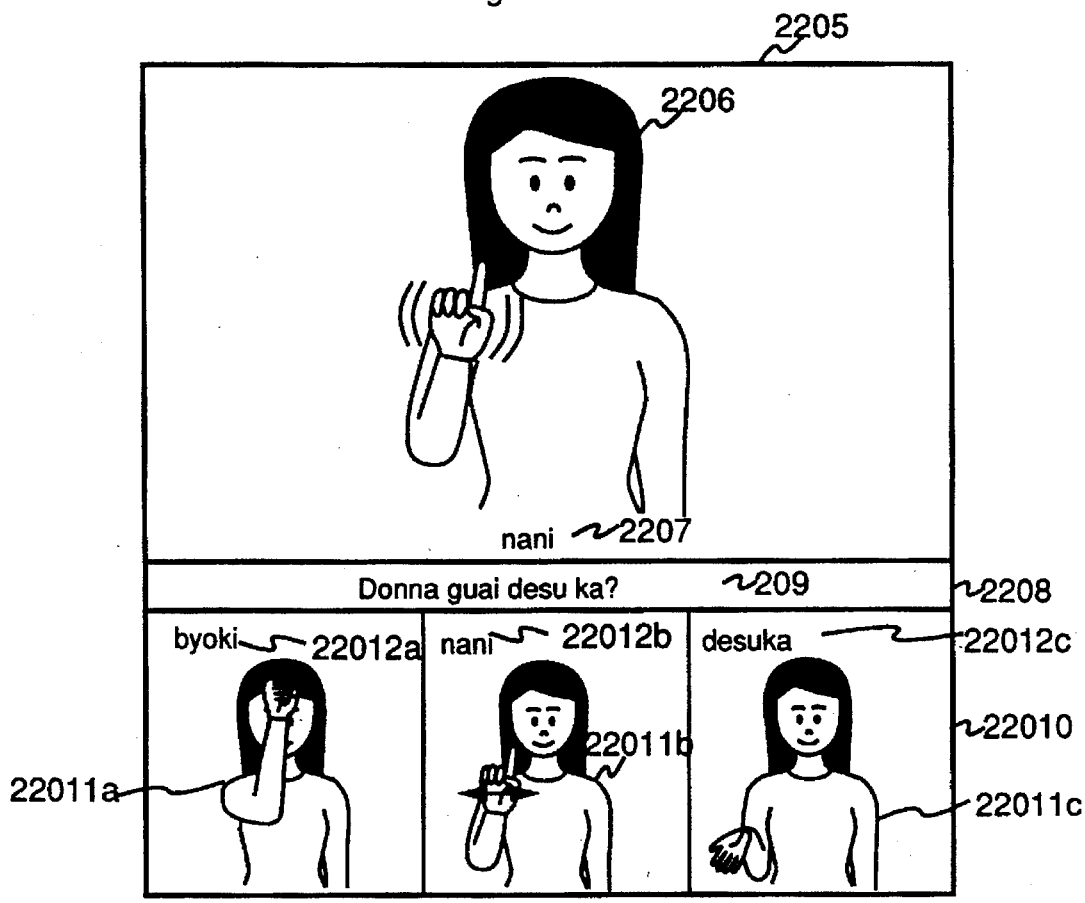
FIGS. 41A and 41B show an example of display of a first candidate in the aurally handicapped person side display unit.

A display 224 of the first candidate in the aurally handicapped person side display unit 36 will be described with reference to FIGS. 41A and 41B. In FIG. 41A, the display of the first candidate is set to a sign language CG display, a sign language illustration display, a sign language word name display and a text display by setting indications 2201, 2202, 2203 and 2204. Through this, as shown in FIG. 41B, a sign language CG 2206 is displayed in a sign language CG area 2205, a sentence 209 is displayed in a text display area 2208, and sign language illustrations 22011a, 22011b and 22011c and sign language word names 22012a, 22012b and 22012c are displayed in a sign language word display area 22010. In the first candidate display by the aurally handicapped person side display unit 36, when the sign language word name display is set, a word name of a sign language word being displayed is displayed in the display of the sign language CG as shown at 2207 in FIG. 41B.

Figure 42:
FIGS. 42A, 42B and 42C show an example of display and modification of a sign language word having a plurality of sign language expressions.
Figure 42:
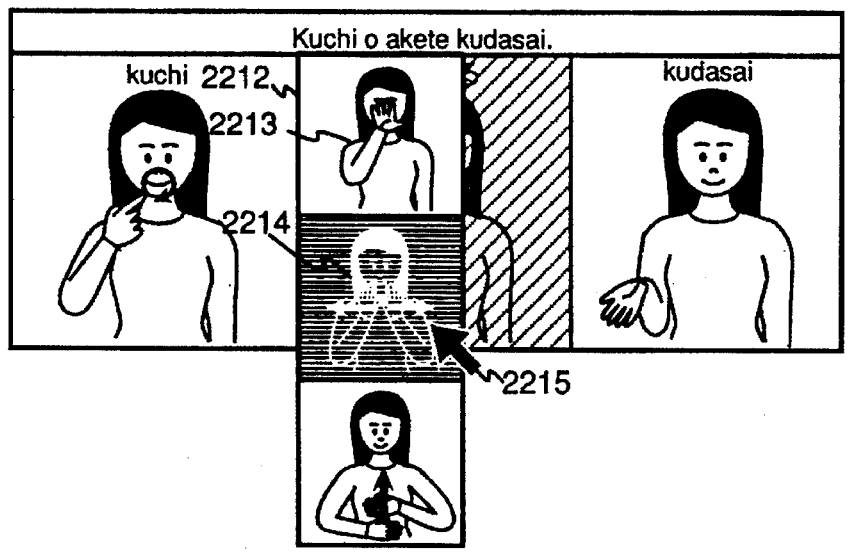
Figure 42:
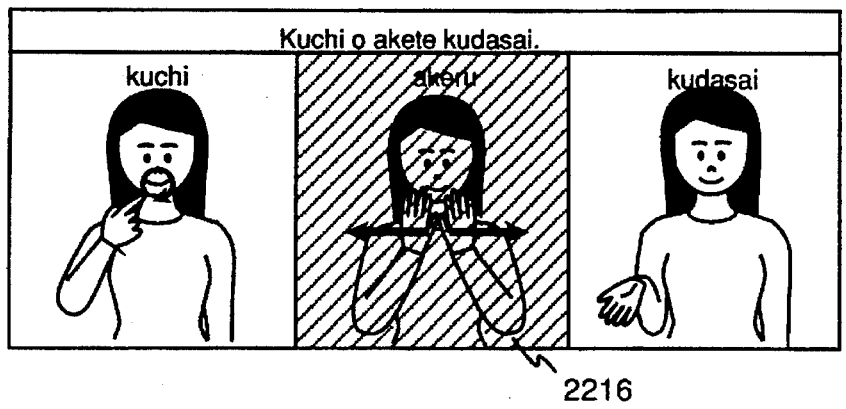

The picture configuration in FIG. 42 is the same as the picture configuration in the display by the aurally normal person side display unit 27 in FIGS. 30A and 30B to FIGS. 34A and 34B, excepting the display of the sign language CG. Since in the aurally handicapped person side display unit 36 the display of the sign language CG takes a leading part, the size of the sign language CG area 2205 is the largest in FIG. 42B. If necessary, the picture configuration may be the same as that of the aurally normal person side display unit 27. Conversely, the picture configuration of the aurally normal person side display unit 27 may be matched with the picture configuration of the aurally handicapped person side display unit 36.

The functions for the display screen manipulated by the mouse are substantially the same as those in the aurally normal person side display unit. But the function by the aurally normal person side display unit to display a sign language word name having a plurality of word names is omitted and instead, the function to display a sign language word having a plurality of sign language expressions is added.

Display of the sign language word having a plurality of sign language expressions will be described with reference to FIGS. 42A, 42B and 42C. In the case of a sign language Word having a plurality of sign language expressions, background color of the sign language word is changed from that of other sign language words and displayed as shown at a sign language word "akeru" (open) 2211 in FIG. 42A in order to make clear the fact that the sign language word has a plurality of word names. Instead of changing the background color, the display color of sign language illustration may be changed or a denotation indicative of the possession of a plurality of sign language expressions may be displayed in a display area of the sign language word.

In FIG. 42B, when the sign language word "akeru" 2211 having a plurality of sign language expressions is selected by means of the mouse, a list of other sign language expressions are displayed in the form of sign language illustrations as shown at 2212 in FIG. 42B. By selecting a correct expression from the list by means of the mouse 2215, the illustration of the sign language word can be changed as shown at 2216 in FIG. 42C. Further, when this changing of word name has been effected, the display selection unit 2185 of FIG. 39 informs the sign language CG animation generating unit 6 of FIG. 22 that the change of the sign language expression is effected, so that sign language CG using the changed sign language expression is generated. In FIG. 42B, an expression 2214 is selected in place of the sign language expression 2213 "akeru" and by informing the sign language CG animation generating unit 6 of this change, sign language CG using the expression 2214 is sent to the layout determining unit 2181.

Figure 43:
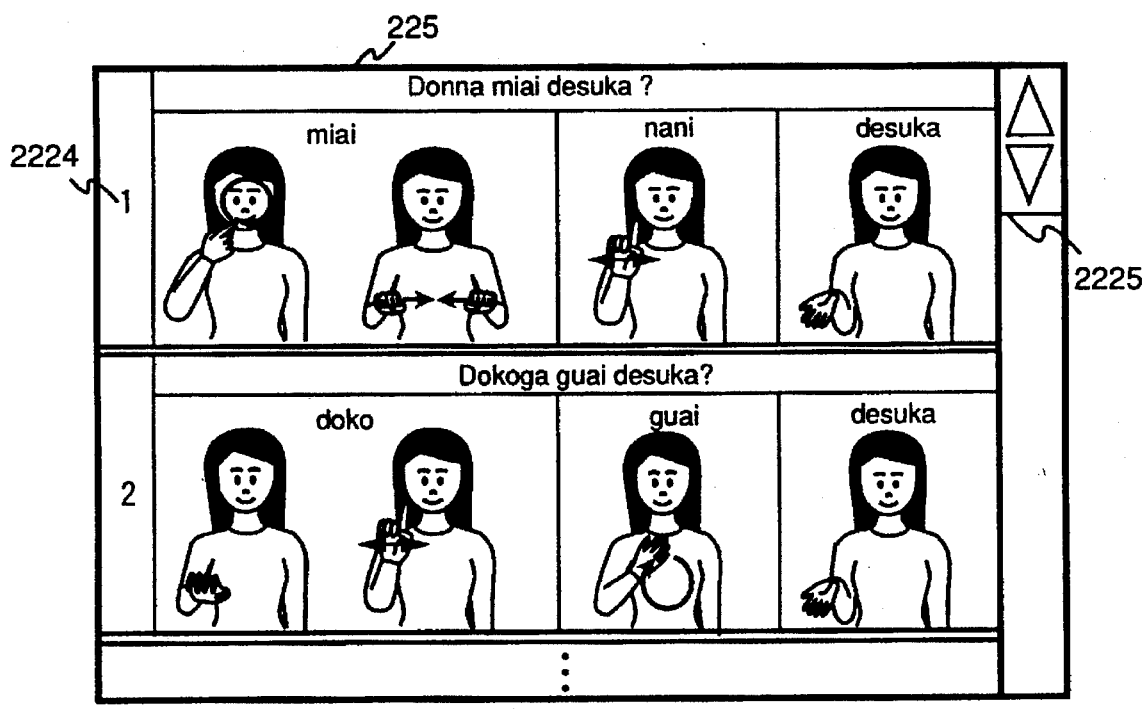
FIGS. 43A and 43B show an example of a candidate other than the first candidate in the aurally handicapped person side display unit.

Next, display 225 of a candidate other than the first candidate in the aurally handicapped person side display unit will be explained with reference to FIGS. 43A and 43B. In FIG. 43A, the display of a candidate other than the first candidate is set to a sign language illustration display, a text display and a sign language word name display by setting indications 2221, 2222 and 2223. Then, in the candidate display, a plurality of candidates are enumerated and displayed as shown in FIG. 43B similarly to the display of a candidate other than the first candidate by the aurally normal person side display unit 27. The functions effected for display of the respective candidates, such as the function of selecting a candidate number 2224 by using the mouse and displaying the selected candidate as the first candidate, and the function of ensuring confirmation of a candidate not displayed on the screen by moving a scroll bar 2225 by means of the mouse, are the same as those in the case of the previously-described candidate display.

Figure 44:
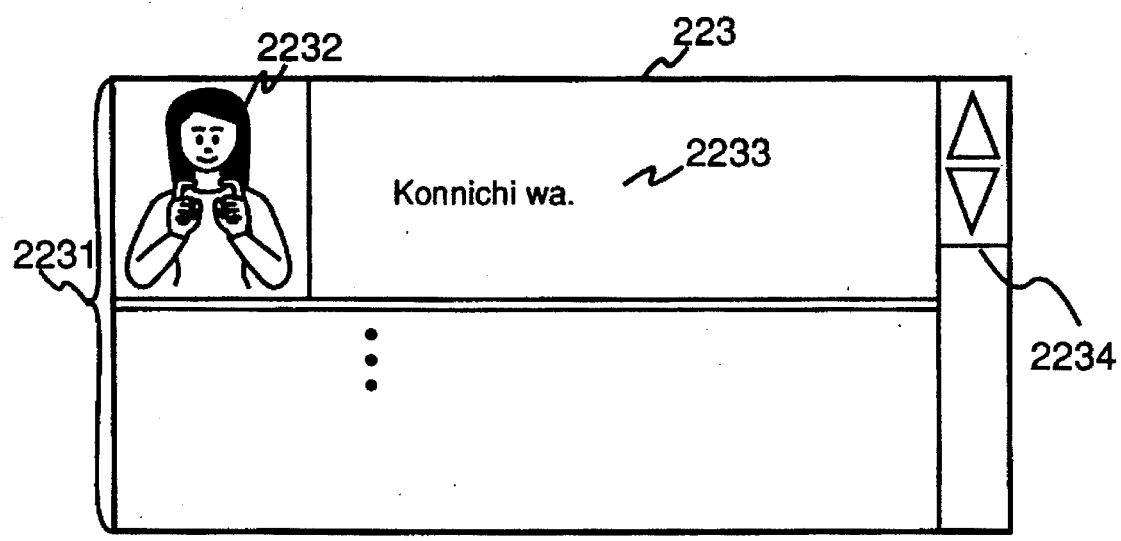
FIG. 44 shows an example of a conversation history in the aurally handicapped person side display unit.

History display 223 of results of translation by the aurally handicapped person side display unit will be described with reference to FIG. 44. Translation results 2231 to date are displayed in order in the display area 223 of a history of translation results. In FIG. 44, of the results of translation of voice language into sign language, only a sign language CG 2232 and a sentence 2233 in voice language are displayed. If necessary, the display form may be the same as that of the first candidate or a candidate other than the first candidate. Also, setting of a history display of translation results may be added to the display setting picture of FIG. 40 to ensure that the display form can be set independently of the display of the first candidate or a candidate other than the first candidate. Also, in the history display 223, by moving a scroll bar 2234 vertically by means of the mouse, translation results not displayed on the screen can be confirmed.

While in the case of the display picture of translation results of FIG. 23 the outputs of the aurally handicapped person side display unit and aurally normal person side display unit are displayed on the same monitor, they may be displayed separately as shown in FIGS. 45A and 45B. FIG. 45A shows an aurally normal person side display picture and FIG. 45B shows an aurally handicapped person side display picture. In the aurally normal person side display picture, a button 2242 adapted to display a menu for setting a method of displaying results of translation of voice language into sign language, a display area 2243 for a first candidate of results of translation of voice language into sign language, and a display area 2244 for a candidate other than the first candidate are displayed in a display area 2241 of results of translation of voice language into sign language.

Displayed in a display area 2245 of results of translation of sign language into voice language are a button 2246 adapted to display a menu for setting a method of displaying results of translation of sign language into voice language, a display area 2247 of a history of translation results of sign language into voice language, and a first candidate 2248 of the translation results of sign language into voice language. In the aurally handicapped person side display picture, a button 22410 adapted to display a menu for setting a method of displaying results of translation of voice language into sign language, a display area 22411 of a history of translation results of voice language into sign language, and a display area 22412 of a first candidate of results of translation of voice language into sign language are displayed in a display area 2249 of results of translation of voice language into sign language. Displayed in a display area 22413 of results of translation of sign language into voice language are a button 22414 adapted to display a menu for setting a method of displaying results of translation of sign language into voice language, a display area 22415 of a first candidate of translation results of sign language into voice language, and a display area 22416 of a candidate other than the first candidate.

The individual display setting pictures and the display forms of the translation history and translation candidate can be set and displayed through the same method as that described previously. But, in FIG. 45, in the display area 2245 of translation results of sign language into voice language in the aurally normal person side display picture and the display area 2249 of translation results of voice language into sign language in the aurally handicapped person side picture, confirmation and modification of polysemous words are not allowed to be carried out. Then, only a result of translation is displayed as a first candidate through confirmation and modification of erroneous recognition carried out by the aurally handicapped person or the aurally normal person. If necessary, the contents of the display areas 2245 and 2249 may be made to be modifiable by the aurally normal person or the aurally handicapped person.

Figure 45:
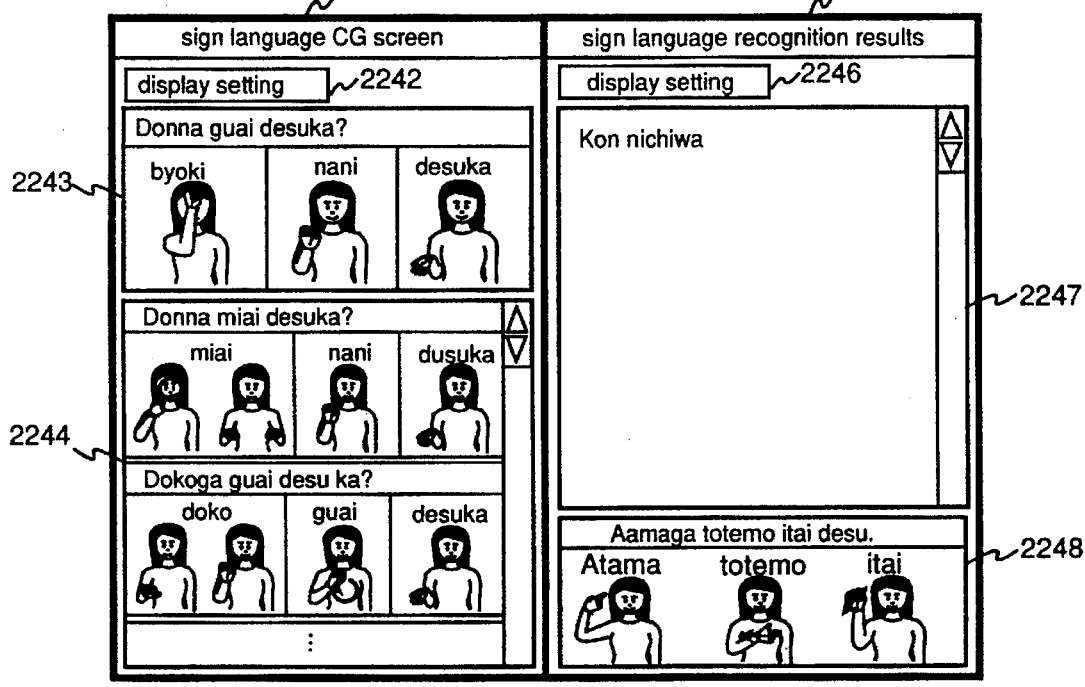
FIG. 45A is a diagram showing an example of a display picture when the aurally normal person side display screen and the aurally handicapped person side display screen are provided separately, depicting an example of the aurally normal person side display screen.
FIG. 45B is a diagram showing an example of a display picture when the aurally normal person side display screen and the aurally handicapped person side display screen are provided separately, depicting an example of the aurally handicapped person side display screen.
Figure 45:
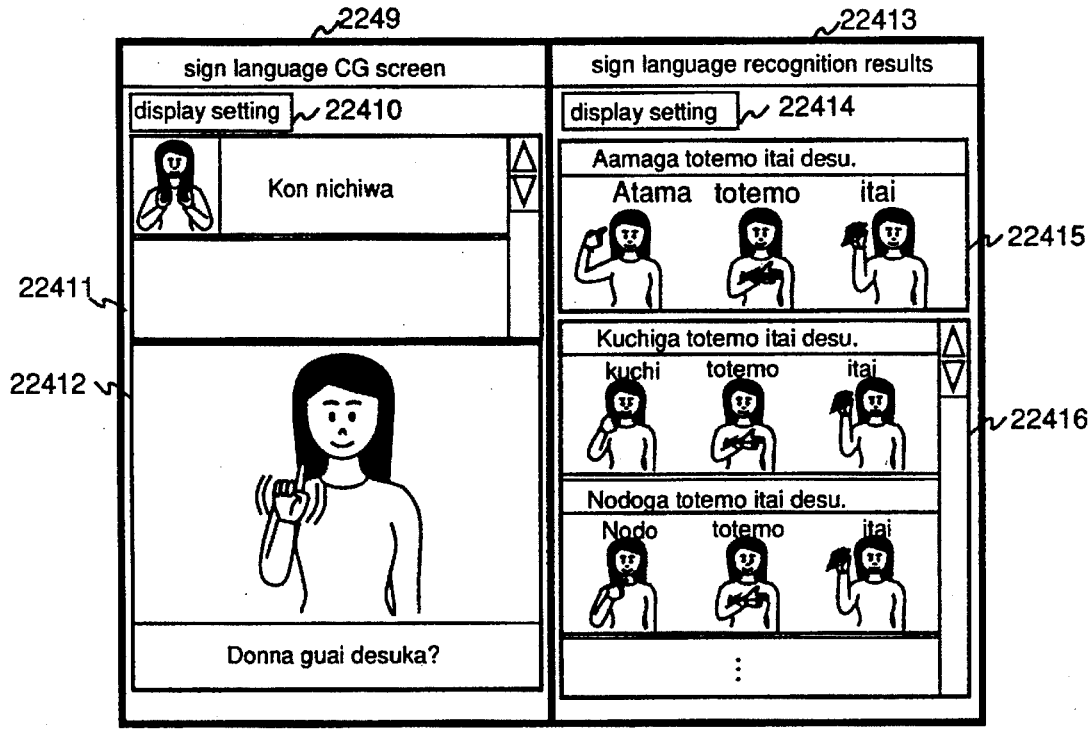

While in FIG. 45 the history of translation results is displayed in only the display areas 2245 and 2249, it may also be displayed in the display areas 2241 and 22413, if necessary. Further, the recognition and modification of the candidate for translation of sign language into voice language by the aurally normal person, the recognition and modification of the candidate for translation of voice language into sign language by the aurally handicapped person, the history display of translation results of voice language into sign language in the aurally normal person side display picture and the history display of translation results of sign language into voice language in the aurally handicapped person side display picture may be made to be selectable by the user in the display setting picture.

Figure 46:
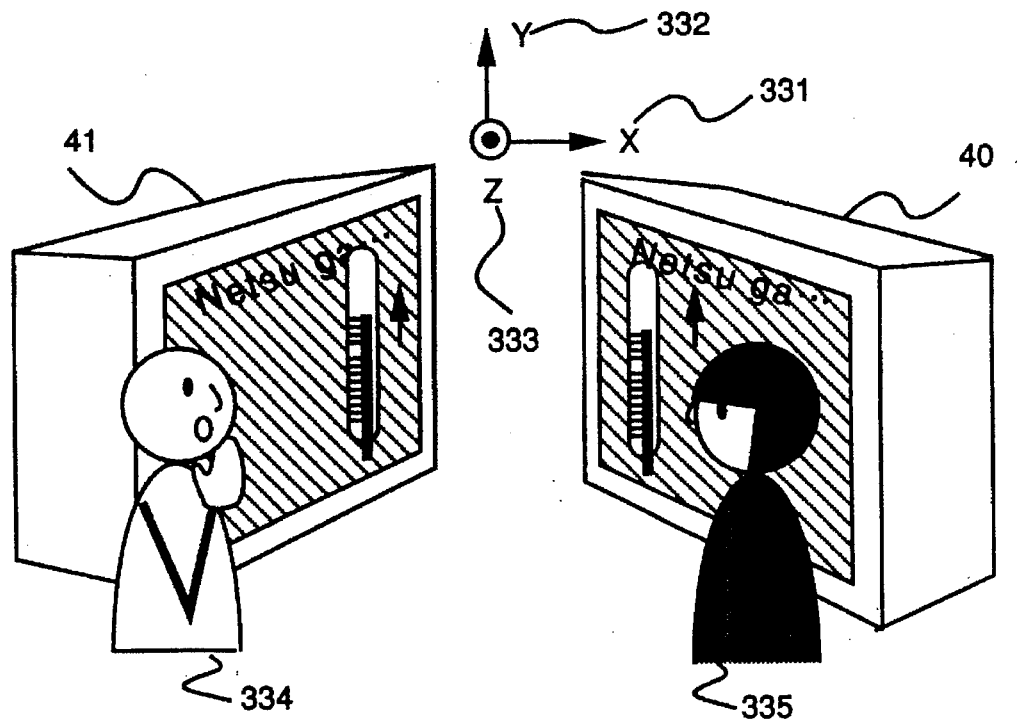
FIG. 46 is a diagram for explaining a use condition (viewed laterally) of the sign language interpretation apparatus.
Figure 47:
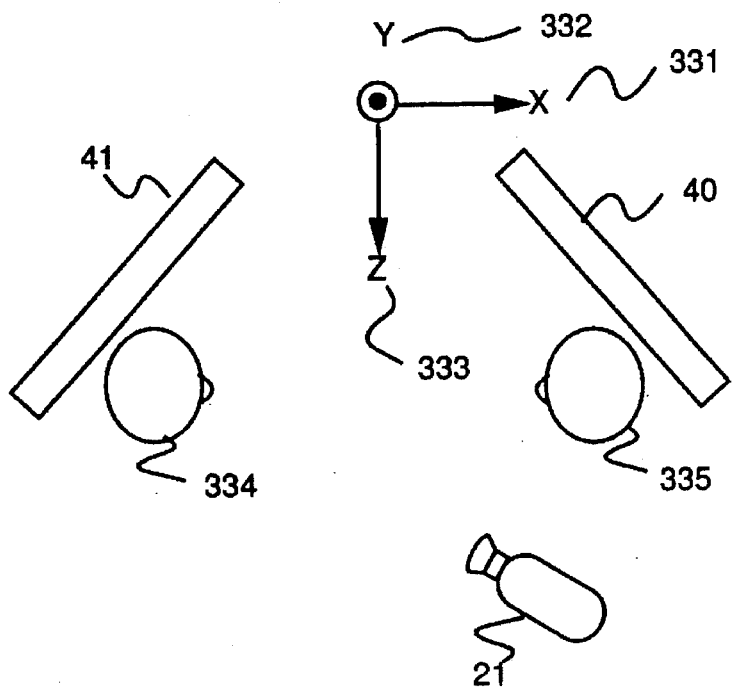
FIG. 47 is a diagram for explaining a use condition (viewed upwardly) of a sign language interpretation system of the sign language interpretation apparatus.

Further, an embodiment will be described in which the monitor 28 for aurally normal person and monitor 7 for aurally handicapped person in FIG. 22 are disposed so as to oppose to each other. FIG. 46 is a diagram showing a state as viewed in the direction of the Z axis 333, and FIG. 47 is a diagram showing a state as viewed in the direction of the Y axis 332. Denoted by 40 and 41 are displays for displaying a picture and a letter, respectively, in order to confirm meanings of a composition in Japanese translated from a sign language, these displays corresponding to the monitors 28 and 7 in FIG. 22, respectively. Denoted by 331 to 333 are Cartesian coordinates for explaining the present drawings, by 334 is an aurally handicapped person who inputs a sign language, by 335 is an aurally normal person and by 21 is a camera for photographing sign languages. The aurally normal person and the aurally handicapped person can converse with each other while opposing to each other in front of the displays 40 and 41, thus realizing circumstances close to natural conversation.

According to the second embodiment of the present invention, when displaying results of translation, a display method can be selected in compliance with a desire of the user and displays of a plurality of forms can be compared and confirmed. Therefore, acceptability or unacceptability of results of translation can be decided easily. Also, since confirmation and modification of a plurality of candidates and of polysemous words in each candidate can be effected with simple means such as a mouse, errors can be corrected easily. Further, since the hearer can judge results of translation to some extent by utilizing the context of a conversation to date, the speaker need not perform perfect correction of erroneously recognized results and smooth communication can be carried out.

We claim:

1. A sign language interpretation apparatus, comprising:
   a sign language recognition and translation apparatus including:
   sign language input means for inputting a sign language;
   means for storing standard sign language patterns;
   first translation means for recognizing the sign language input by said sign language input means by sign said standard sign language patterns, and for translating the recognized sign language into a voice language;
   first display means for displaying results of translation of sign language into voice language; and
   means for controlling display of the translation results displayed on said first display means, and for controlling modification of results displayed on said first display means; and
   a sign language generation apparatus including:
   voice language input means for inputting a voice language;
   second translation means for translating a voice language input by said voice language input means into a series of sign language words;
   pattern memory means for storing computer graphics patterns of sign language words;
   means for generating sign language computer graphics by retrieving computer graphic patterns of sign language words from said pattern memory means in accordance with the translated sign language word series and by interpolating hand motion between sign language word computer graphic patterns;
   second display means for displaying the generated sign language computer graphics; and
   means for controlling display of the translation results displayed on said second display means, and for controlling modification of results displayed on said second display means;
   wherein said first display means includes means for providing the following displays from which a user selects at least one: results of said translation of sign language into a sentence in voice language, results of said translation of sign language into words in voice language, illustrations of words of said sign language input by said sign language input means, and sign language computer graphics generated by translating back the sentence in voice language, translated from the sign language input by said sign language input means, into sign language; and
   wherein said second display means includes means for providing the following displays, from which a user selects at least one: sign language computer graphics translated from the voice language input by the voice language input means, voice language words corresponding to sign language words constituting said sign language computer graphics, an illustration of sign language words, and voice language sentence.

2. A sign language interpretation apparatus according to claim 1,
wherein said first display means is provided for an aurally normal person and said second display means is provided for an aurally handicapped person;
wherein said second display means includes:
means for displaying results of said translation of sign language into voice language in the form of at least one of an image of a sign language input using a video camera as said said language input means;
means for displaying a voice language sentence resulting from the translation of the sign language input by the sign language input means into voice language, said illustrations of words in voice language corresponding to sign language words constituting the sign language input by said sign language input means;
means for displaying illustrations of said sign language words; and
means for displaying results of translating the translated voice language back into sign language computer graphics; and
wherein said first display means includes;
means for displaying results of translating the translated sign language back into voice language, in respect of only results of correction of erroneous recognition, in the form of at least one of illustrations of voice language words constituting the sign language input by said sign language input means and of sign language words, and a voice language sentence resulting from said translation of the sign language input by said sign language input means into voice language; and
means for displaying results of said translation of voice language into sign language in the form of at least one of a sentence resulting from recognition of a voice language sentence or direct input of a voice language sentence and illustrations of words constituting the voice language sentence, and of sign language words; and
wherein said second display means further displays said results of said translation of voice language into sign language, in respect of only results of correction of erroneous recognition, in the form of at least one of said voice language sentence, illustrations of word names constituting the voice language sentence, and sign language words and results of said translation of voice language into sign language computer graphics.

3. A sign language interpretation apparatus according to claim 1, wherein said second display means includes means for dividing, word-by-word, image data of the sign language, on the basis of results of recognition of individual sign language words constituting the sign language, when results of translation of sign language into voice language are displayed; and means for displaying the divided image data together with interpreted voice language.

4. A sign language interpretation apparatus according to claim 1, wherein said second display means includes means for displaying, as an illustration of a sign language word, a still image of sign language stored in advance in respect of each word, or a key frame data for sign language computer graphics important to the action of sign language from data for sign language; and means for displaying a setting indication.

5. A sign language interpretation apparatus according to claim 4, wherein said second display means further displays, as an illustration of a sign language word, an indication of a locus of motion.

6. A sign language interpretation apparatus according to claim 1, wherein said first display means includes:
means for displaying an indication representative of a polysemous voice language word upon display of results of translation of sign language into voice language, when a plurality of voice language words corresponding to a sign language word are available, together with one of the plurality of words or an illustration of the sign language word; and
means for displaying a pull-down menu containing the plurality of voice language words other than said one of the plurality of voice language words, by which said one of the plurality of voice language words is confirmed and changed to another of said plurality of voice language words if necessary.

7. A sign language interpretation apparatus according to claim 6, wherein the displayed selected word indicates a voice language word used in a voice language sentence translated from sign language input by said sign language input means, and wherein when a different voice language word is selected, the first display means changes the display to a voice language sentence utilizing the selected word if the results of the selection lead to a corrected sentence in voice language.

8. A sign language interpretation apparatus according to claim 1, wherein said second display means includes:
means for displaying an indication representative of a polysemous sign language word upon display of results of translation of voice language into sign language, when a plurality of sign language words corresponding to the voice language word to the translated are available, together with one of the plurality of sign language words or an illustration of one of the plurality of sign language words; and
means for displaying a pull-down menu containing illustrations of the plurality of sign language words other than said one of the plurality of sign language words, by which said one of the plurality of sign language words is confirmed and changed if necessary.

9. A sign language interpretation apparatus according to claim 8, wherein the displayed selected illustration of a sign language word indicates an illustration of a sign language word used in a sign language sentence translated from voice language input by said voice language input means, and wherein when a different sign language word is selected, the second display means changes the display to a sign language sentence utilizing the selected sign language word when the results of the selection lead to a corrected sentence in sign language.

10. A sign language interpretation apparatus according to claim 1, wherein by changing the display form of a word or illustration of a sign language word corresponding to displayed sign language computer graphics, a sign language word displayed in sign language computer graphics is confirmed.

11. A sign language interpretation apparatus according to claim 1, further comprising means for displaying a history of translation on the screen, by which the conversation that has been carried out is displayed.

12. A sign language interpretation apparatus according to claim 1, wherein said first display means and said second display means face each other.

13. A sign language interpretation apparatus according to claim 1, wherein said first display means provides, for said selection by said user, a combination of said displays of said first display means, and at least one of said displays of said second display means.

* * * * *